US012579745B2

(12) United States Patent (10) Patent No.: US 12,579,745 B2
Rondao Alface et al. (45) Date of Patent: Mar. 17, 2026

(54) CURVATURE-GUIDED INTER-PATCH 3D INPAINTING FOR DYNAMIC MESH CODING

(71) Applicant: Nokia Technologies Oy, Espoo (FI)

(72) Inventors: Patrice Rondao Alface, Evere (BE); Aleksei Martemianov, Tampere (FI); Lukasz Kondrad, Munich (DE); Lauri Aleksi Ilola, Tampere (FI); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 355 days.

(21) Appl. No.: 18/122,848

(22) Filed: Mar. 17, 2023

(65) Prior Publication Data

US 2023/0316647 A1 Oct. 5, 2023

Related U.S. Application Data

(60) Provisional application No. 63/321,201, filed on Mar. 18, 2022.

(51) Int. Cl.
*G06T 17/20* (2006.01)
*G06T 9/00* (2006.01)
*G06T 19/20* (2011.01)
(52) U.S. Cl.
CPC .............. *G06T 17/20* (2013.01); *G06T 9/001* (2013.01); *G06T 19/20* (2013.01)
(58) Field of Classification Search
None
See application file for complete search history.

(56) References Cited

U.S. PATENT DOCUMENTS

| | | | |
|---|---|---|---|
| 11,540,906 B2 * | 1/2023 | Nikolskiy ............ | A61C 9/0006 |
| 2019/0087978 A1 | 3/2019 | Tourapis et al. | |
| 2020/0296401 A1 | 9/2020 | Lee et al. | |
| 2021/0090301 A1 | 3/2021 | Mammou et al. | |

(Continued)

OTHER PUBLICATIONS

"DRACO 3D Data Compression", https://goodgle.github.io/draco/, Mar. 9, 2022, 3 pages.

(Continued)

*Primary Examiner* — Saptarshi Mazumder
(74) *Attorney, Agent, or Firm* — McCarter & English, LLP

(57) ABSTRACT

An apparatus performs an encoding process including: obtaining a mesh representation of a 3D object; segmenting the mesh representation into 2D projections; reconstructing a 3D mesh from the segmented 2D projections by stitching reconstructed patches, the patches being submeshes of the reconstructed 3D mesh, the stitching performing border fusion based at least on curvature of the patches, to derive parameters for the stitching; and encoding the segmented 2D projections into a bitstream. The apparatus signals the parameters in or along with the bitstream and transmits. An apparatus performing decoding receives the bitstream and signaled parameters, reconstructs a 3D mesh from the segmented 2D projections, and stitches reconstructed submeshes created during the reconstruction together at least as patches, the stitching using the signaled parameters to fuse together pairs of vertices for borders of corresponding patches. The apparatus outputs a modified 3D mesh based at least on the stitching.

20 Claims, 20 Drawing Sheets

(56) References Cited

U.S. PATENT DOCUMENTS

| | | | | |
|---|---|---|---|---|
| 2021/0209809 A1 | 7/2021 | Najaf-Zadeh et al. | | |
| 2021/0217202 A1* | 7/2021 | Zakharchenko | ..... | H04N 19/597 |
| 2021/0295566 A1 | 9/2021 | Graziosi et al. | | |
| 2021/0383590 A1 | 12/2021 | Roimela et al. | | |
| 2024/0265638 A1* | 8/2024 | Hayashi | ............... | H04N 19/597 |
| 2024/0346701 A1* | 10/2024 | Kuma | .................... | G06T 17/20 |

OTHER PUBLICATIONS

Bernardini, Fausto, et al., "The Ball-Pivoting Algorithm for Surface Reconstruction", IEEE Transactions On Visualization And Computer Graphics, vol. 5 No. 4, Oct.-Dec. 1999, pp. 349-359.

Yamasaki, Toshihiko, et al., "Patch-Based Compression For Time-Varying Meshes", Proceedings of 2010IEEE 17th International Conference on Image Processing, Sep. 2010, pp. 3433-3436.

Sheng, Yun, et al., "A Pde method for patchwise approximation of large polygon meshes", The Visual Visual Computer, 26(6), Jun. 2010, pp. 975-984.

Arvanitis, Gerasimos, et al., "3D Mesh Inpainting UsingMatrix Completion via Augmented Lagrange Multiplier Method", 2018 IEEE 13th Image, Video and Multidimensional Signal Processing Workshop (IVMSP), Aug. 2018, 5 pages.

Rhyu, Sungryeul, et al., "[V-PCC] [New Proposal] V-PCC extension for mesh coding", Samsung Electronics, ISO/IEC JTC1/SC29/ WVG 11 m47608, Mar. 2019, 3 pages.

Boyce, Jill M. et al., "MPEG Immersive Video Coding Standard", Proceedings of the IEEE, vol. 109, No. 9, Sep. 2021, pp. 1521-1536.

ISO/IEC 23090-5:20221(2E), "Information technology—Coded Representation of Immersive Media—Part 5: Visual Volumetric Video-based Coding (V3C) and Video-based point Cloud Compression (V-PCC)", Dec. 15, 2021, 379 pages.

\* cited by examiner

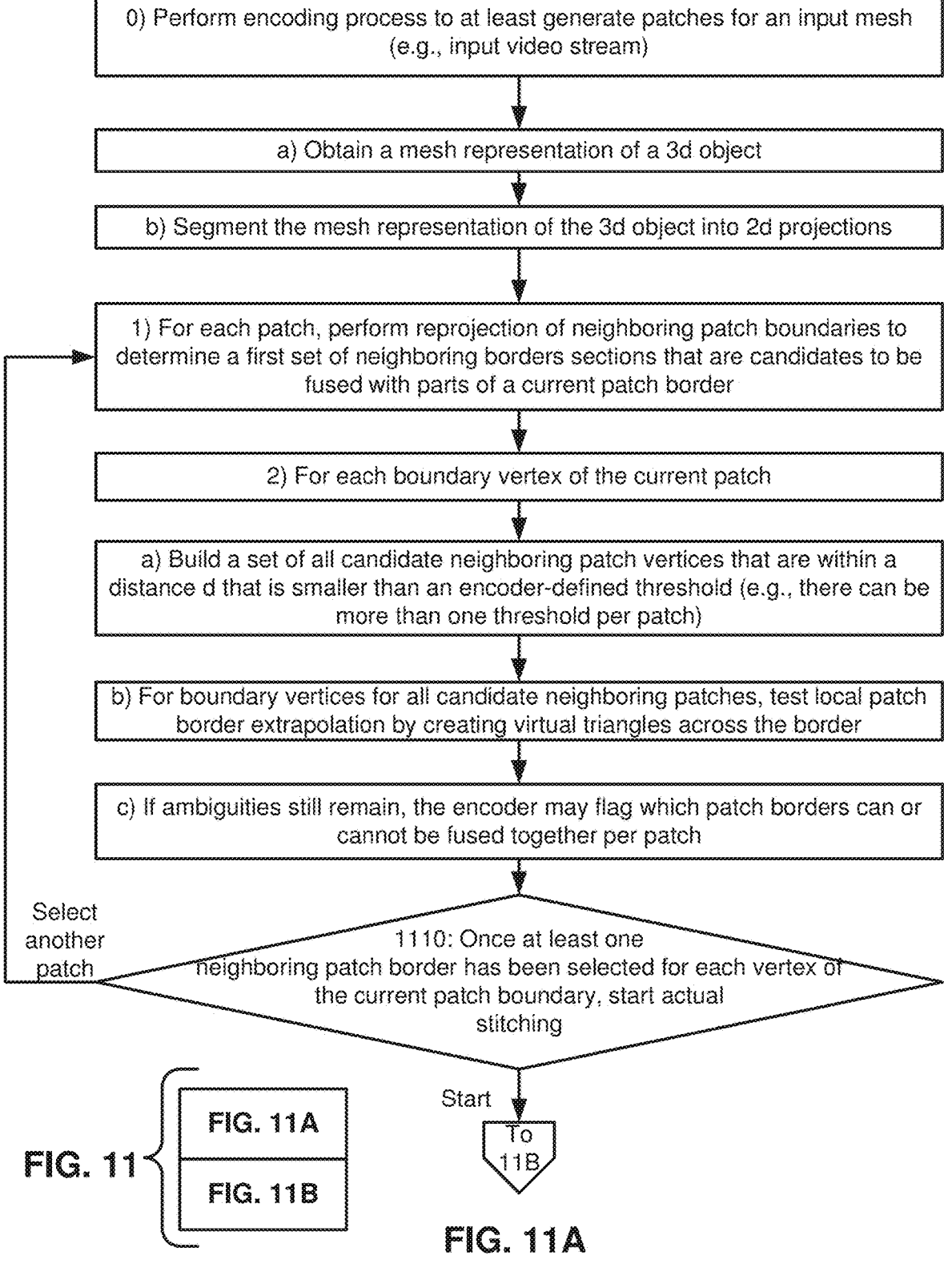

0) Perform encoding process to at least generate patches for an input mesh (e.g., input video stream)

a) Obtain a mesh representation of a 3d object b) Segment the mesh representation of the 3d object into 2d projections 1) For each patch, perform reprojection of neighboring patch boundaries to determine a first set of neighboring borders sections that are candidates to be fused with parts of a current patch border 2) For each boundary vertex of the current patch a) Build a set of all candidate neighboring patch vertices that are within a distance d that is smaller than an encoder-defined threshold (e.g., there can be more than one threshold per patch)

b) For boundary vertices for all candidate neighboring patches, test local patch border extrapolation by creating virtual triangles across the border c) If ambiguities still remain, the encoder may flag which patch borders can or cannot be fused together per patch Select another patch 1110: Once at least one neighboring patch border has been selected for each vertex of the current patch boundary, start actual stitching Start To 11B

From 11A

3) Perform stitching cross curvature orthogonally to the borders seen from the two patch borders to be fused a) Map each border vertex from the first patch to the other patch's border edges as vertices that lie on edges of the boundary or optionally on faces of the boundary b) Map each border vertex from the other patch to the first patch as vertices that lie on edges of the boundary or optionally on faces of the boundary c) Modify local connectivity to connect these mapped vertices to the other patch vertices as new triangles; in case of vertices mapped inside triangles, part of the triangle is removed so that the mapped vertex lies on the patch border d) Fuse together the pairs of vertices (original and mapped) (e.g., their 3d position and texture coordinates)

e) For vertices with no neighboring patch data in the direction to be extrapolated: either these vertices can still be merged with another point from a neighboring patch because, e.g., a distance criterion is met; or they are left untouched, because there is no reliable way to know if it is a problem due to patch encoding or if it is the actual original mesh that has such a shape 4) Apply local smoothing filtering to ensure normal direction continuity and smoothness across the border 5) Derive parameters at the encoder that describe the stitching criteria for the decoder, and store as signaling for bitstream 6) Continue with encoding in order to produce (e.g., and transmit) output bitstream a) Encode the segmented 2d projections into a bitstream b) Signaling the parameters in or along with the bitstream c) Transmitting the bitstream and the parameters

FIG. 11B

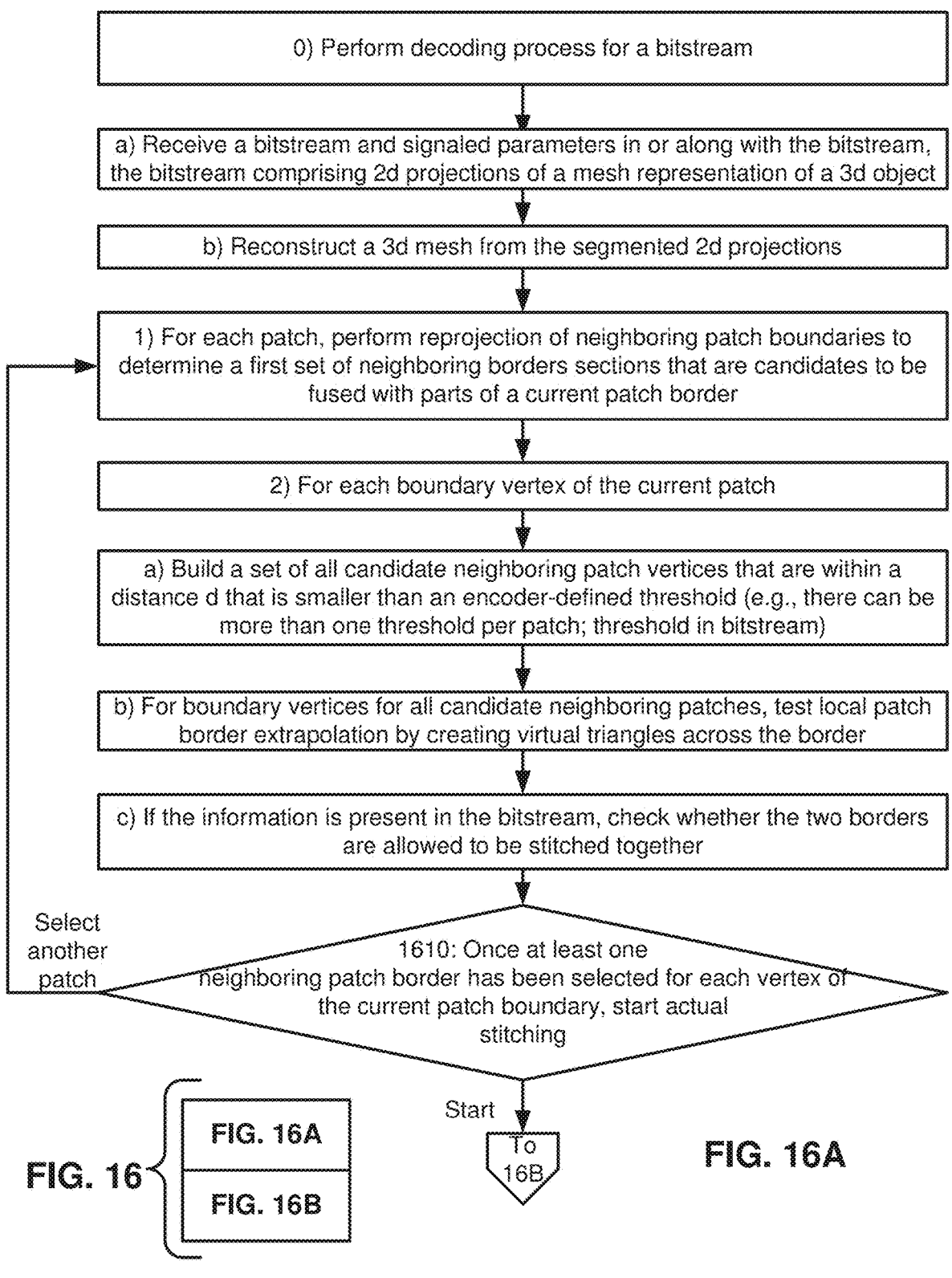

0) Perform decoding process for a bitstream a) Receive a bitstream and signaled parameters in or along with the bitstream, the bitstream comprising 2d projections of a mesh representation of a 3d object b) Reconstruct a 3d mesh from the segmented 2d projections 1) For each patch, perform reprojection of neighboring patch boundaries to determine a first set of neighboring borders sections that are candidates to be fused with parts of a current patch border 2) For each boundary vertex of the current patch a) Build a set of all candidate neighboring patch vertices that are within a distance d that is smaller than an encoder-defined threshold (e.g., there can be more than one threshold per patch; threshold in bitstream)

b) For boundary vertices for all candidate neighboring patches, test local patch border extrapolation by creating virtual triangles across the border c) If the information is present in the bitstream, check whether the two borders are allowed to be stitched together Select another patch 1610: Once at least one neighboring patch border has been selected for each vertex of the current patch boundary, start actual stitching Start To 16B

From
16A

3) Perform stitching cross curvature orthogonally to the borders seen from the two patch borders to be fused a) Map each border vertex from the first patch to the other patch's border edges as vertices that lie on edges of the boundary or optionally on faces of the boundary b) Map each border vertex from the other patch to the first patch as vertices that lie on edges of the boundary or optionally on faces of the boundary c) Modify local connectivity to connect these mapped vertices to the other patch vertices as new triangles; in case of vertices mapped inside triangles, part of the triangle is removed so that the mapped vertex lies on the patch border d) Fuse together the pairs of vertices (original and mapped) (e.g., their 3d position and texture coordinates)

e) For vertices with no neighboring patch data in the direction to be extrapolated: either these vertices can still be merged with another point from a neighboring patch because, e.g., a distance criterion is met; or they are left untouched, because there is no reliable way to know if it is a problem due to patch encoding or if it is the actual original mesh that has such a shape 4) Apply local smoothing filtering to ensure normal direction continuity and smoothness across the border 6) Continue with decoding in order to produce a modified three-dimensional mesh, as an output mesh, based at least on the stitching, the output mesh suitable for display as a representation of the three-dimensional object a) Output the output mesh

FIG. 16B

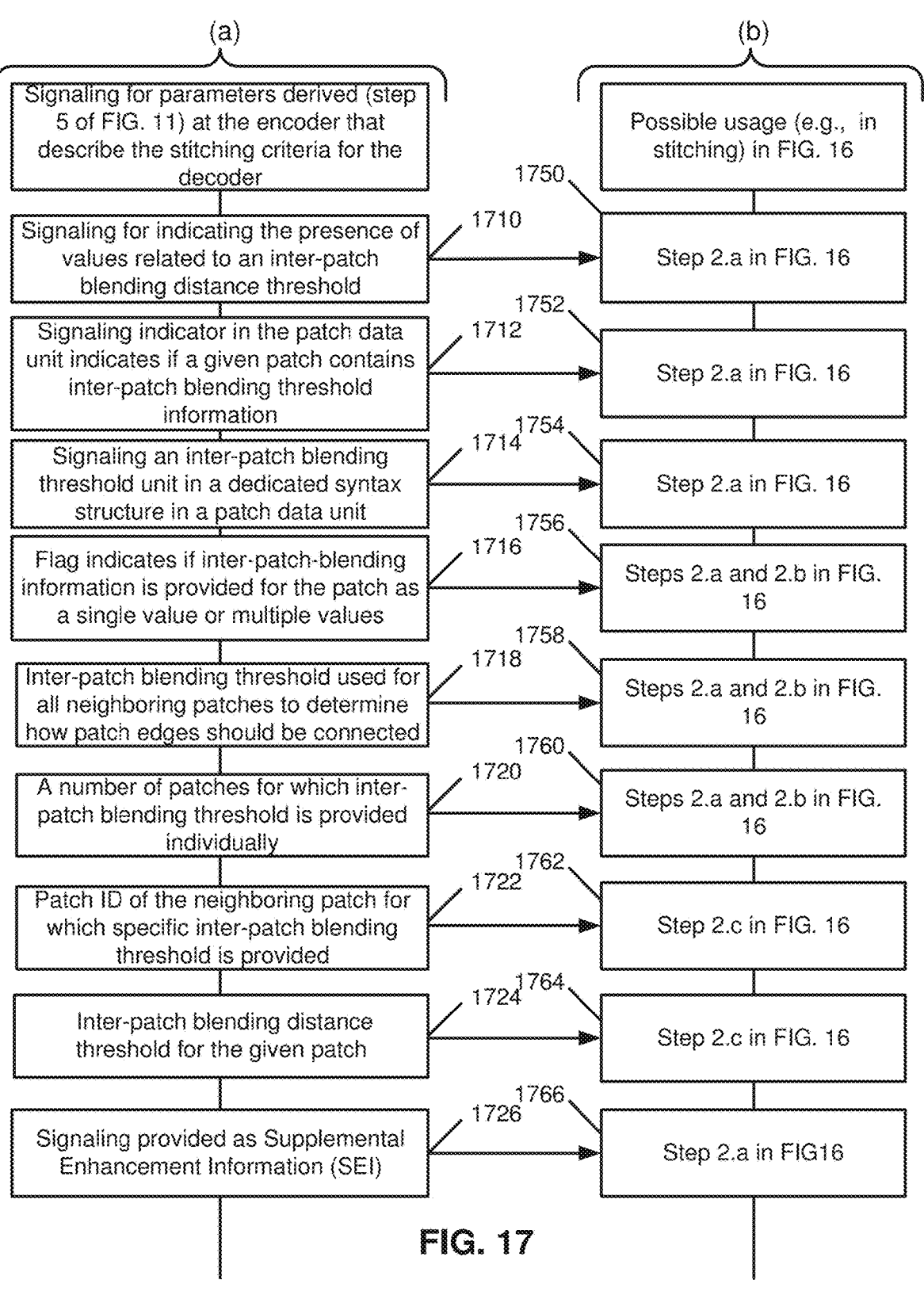

(a)

(b)

Signaling for parameters derived (step 5 of FIG. 11) at the encoder that describe the stitching criteria for the decoder Possible usage (e.g., in stitching) in FIG. 16

1750

Signaling for indicating the presence of values related to an inter-patch blending distance threshold

1710

Step 2.a in FIG. 16

1752

Signaling indicator in the patch data unit indicates if a given patch contains inter-patch blending threshold information

1712

Step 2.a in FIG. 16

1754

Signaling an inter-patch blending threshold unit in a dedicated syntax structure in a patch data unit

1714

Step 2.a in FIG. 16

1756

Flag indicates if inter-patch-blending information is provided for the patch as a single value or multiple values

1716

Steps 2.a and 2.b in FIG. 16

1758

Inter-patch blending threshold used for all neighboring patches to determine how patch edges should be connected

1718

Steps 2.a and 2.b in FIG. 16

1760

A number of patches for which inter-patch blending threshold is provided individually

1720

Steps 2.a and 2.b in FIG. 16

1762

Patch ID of the neighboring patch for which specific inter-patch blending threshold is provided

1722

Step 2.c in FIG. 16

1764

Inter-patch blending distance threshold for the given patch

1724

Step 2.c in FIG. 16

1766

Signaling provided as Supplemental Enhancement Information (SEI)

1726

Step 2.a in FIG16

FIG. 17

CURVATURE-GUIDED INTER-PATCH 3D INPAINTING FOR DYNAMIC MESH CODING

TECHNICAL FIELD

Exemplary embodiments herein relate generally to encoding, signaling and rendering of a volumetric video that is based on mesh coding and, more specifically, relates to systems for reconstructed mesh surfaces.

BACKGROUND

In video coding, an input mesh is processed in order to compress the mesh and create a bitstream. This processing creates sections of a processed mesh referred to as patches. The patches may not fit together as well as they could.

BRIEF SUMMARY

This section is intended to include examples and is not intended to be limiting.

In an exemplary embodiment, a method is disclosed that includes performing by an apparatus an encoding process comprising: obtaining a mesh representation of a three-dimensional object; segmenting mesh representation of the three-dimensional object into two-dimensional projections; reconstructing a three-dimensional mesh from the segmented two-dimensional projections at least by stitching reconstructed patches, the patches being submeshes of the reconstructed three-dimensional mesh, the stitching performing border fusion based at least on curvature of the patches, to derive parameters for the stitching; encoding the segmented two-dimensional projections into a bitstream. The method also includes signaling by the apparatus the parameters in or along with the bitstream, and transmitting by the apparatus the bitstream and the parameters.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: performing by an apparatus an encoding process comprising: obtaining a mesh representation of a three-dimensional object; segmenting mesh representation of the three-dimensional object into two-dimensional projections; reconstructing a three-dimensional mesh from the segmented two-dimensional projections at least by stitching reconstructed patches, the patches being submeshes of the reconstructed three-dimensional mesh, the stitching performing border fusion based at least on curvature of the patches, to derive parameters for the stitching; encoding the segmented two-dimensional projections into a bitstream; signaling by the apparatus the parameters in or along with the bitstream; and transmitting by the apparatus the bitstream and the parameters.

An exemplary computer program product includes a computer-readable storage medium bearing instructions that, when executed by an apparatus, cause the apparatus to perform at least the following: performing by an apparatus an encoding process comprising: obtaining a mesh representation of a three-dimensional object; segmenting mesh representation of the three-dimensional object into two-dimensional projections; reconstructing a three-dimensional mesh from the segmented two-dimensional projections at least by stitching reconstructed patches, the patches being submeshes of the reconstructed three-dimensional mesh, the stitching performing border fusion based at least on curvature of the patches, to derive parameters for the stitching; encoding the segmented two-dimensional projections into a bitstream; signaling by the apparatus the parameters in or along with the bitstream; and transmitting by the apparatus the bitstream and the parameters.

In another exemplary embodiment, an apparatus comprises means for performing: performing by an apparatus an encoding process comprising: obtaining a mesh representation of a three-dimensional object; segmenting mesh representation of the three-dimensional object into two-dimensional projections; reconstructing a three-dimensional mesh from the segmented two-dimensional projections at least by stitching reconstructed patches, the patches being submeshes of the reconstructed three-dimensional mesh, the stitching performing border fusion based at least on curvature of the patches, to derive parameters for the stitching; encoding the segmented two-dimensional projections into a bitstream; signaling by the apparatus the parameters in or along with the bitstream; and transmitting by the apparatus the bitstream and the parameters.

In an exemplary embodiment, a method is disclosed that includes receiving by an apparatus a bitstream and signaled parameters in or along with the bitstream, the bitstream comprising two-dimensional projections of a mesh representation of a three-dimensional object. the method includes performing by the apparatus a decoding process comprising: reconstructing a three-dimensional mesh from the segmented two-dimensional projections; and stitching reconstructed submeshes created during the reconstruction together at least as patches, the stitching using the signaled parameters to fuse together pairs of vertices for borders of corresponding patches. The method also includes outputting by the apparatus a modified three-dimensional mesh, as an output mesh, based at least on the stitching, the output mesh suitable for display as a representation of the three-dimensional object.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform receiving by an apparatus a bitstream and signaled parameters in or along with the bitstream, the bitstream comprising two-dimensional projections of a mesh representation of a three-dimensional object; performing by the apparatus a decoding process comprising: reconstructing a three-dimensional mesh from the segmented two-dimensional projections; and stitching reconstructed submeshes created during the reconstruction together at least as patches, the stitching using the signaled parameters to fuse together pairs of vertices for borders of corresponding patches; and outputting by the apparatus a modified three-dimensional mesh, as an output mesh, based at least on the stitching, the output mesh suitable for display as a representation of the three-dimensional object.

An exemplary computer program product includes a computer-readable storage medium bearing instructions that, when executed by an apparatus, cause the apparatus to perform at least the following: receiving by an apparatus a bitstream and signaled parameters in or along with the bitstream, the bitstream comprising two-dimensional projections of a mesh representation of a three-dimensional object; performing by the apparatus a decoding process comprising: reconstructing a three-dimensional mesh from the segmented two-dimensional projections; and stitching reconstructed submeshes created during the reconstruction together at least as patches, the stitching using the signaled parameters to fuse together pairs of vertices for borders of corresponding patches; and outputting by the apparatus a modified three-dimensional mesh, as an output mesh, based at least on the stitching, the output mesh suitable for display as a representation of the three-dimensional object.

In another exemplary embodiment, an apparatus comprises means for performing: receiving by an apparatus a bitstream and signaled parameters in or along with the bitstream, the bitstream comprising two-dimensional projections of a mesh representation of a three-dimensional object; performing by the apparatus a decoding process comprising: reconstructing a three-dimensional mesh from the segmented two-dimensional projections; and stitching reconstructed submeshes created during the reconstruction together at least as patches, the stitching using the signaled parameters to fuse together pairs of vertices for borders of corresponding patches; and outputting by the apparatus a modified three-dimensional mesh, as an output mesh, based at least on the stitching, the output mesh suitable for display as a representation of the three-dimensional object.

BRIEF DESCRIPTION OF THE DRAWINGS

In the attached Drawing Figures:

FIG. 11, which is split over FIGS. 11A and 11B, is a logic flow diagram for curvature-guided inter-patch 3D inpainting for dynamic mesh coding, in accordance with an exemplary embodiment;

FIG. 16, which is split over FIGS. 16A and 16B, is a logic flow diagram for curvature-guided inter-patch 3D inpainting for dynamic mesh decoding, in accordance with an exemplary embodiment; and FIG. 17 illustrates possible extensions, for instance for a V3C bitstream, for signaling for various values used to provide for curvature-guided inter-patch 3D inpainting for dynamic mesh coding, in accordance with exemplary embodiments.

DETAILED DESCRIPTION OF THE DRAWINGS

Figure 1A:
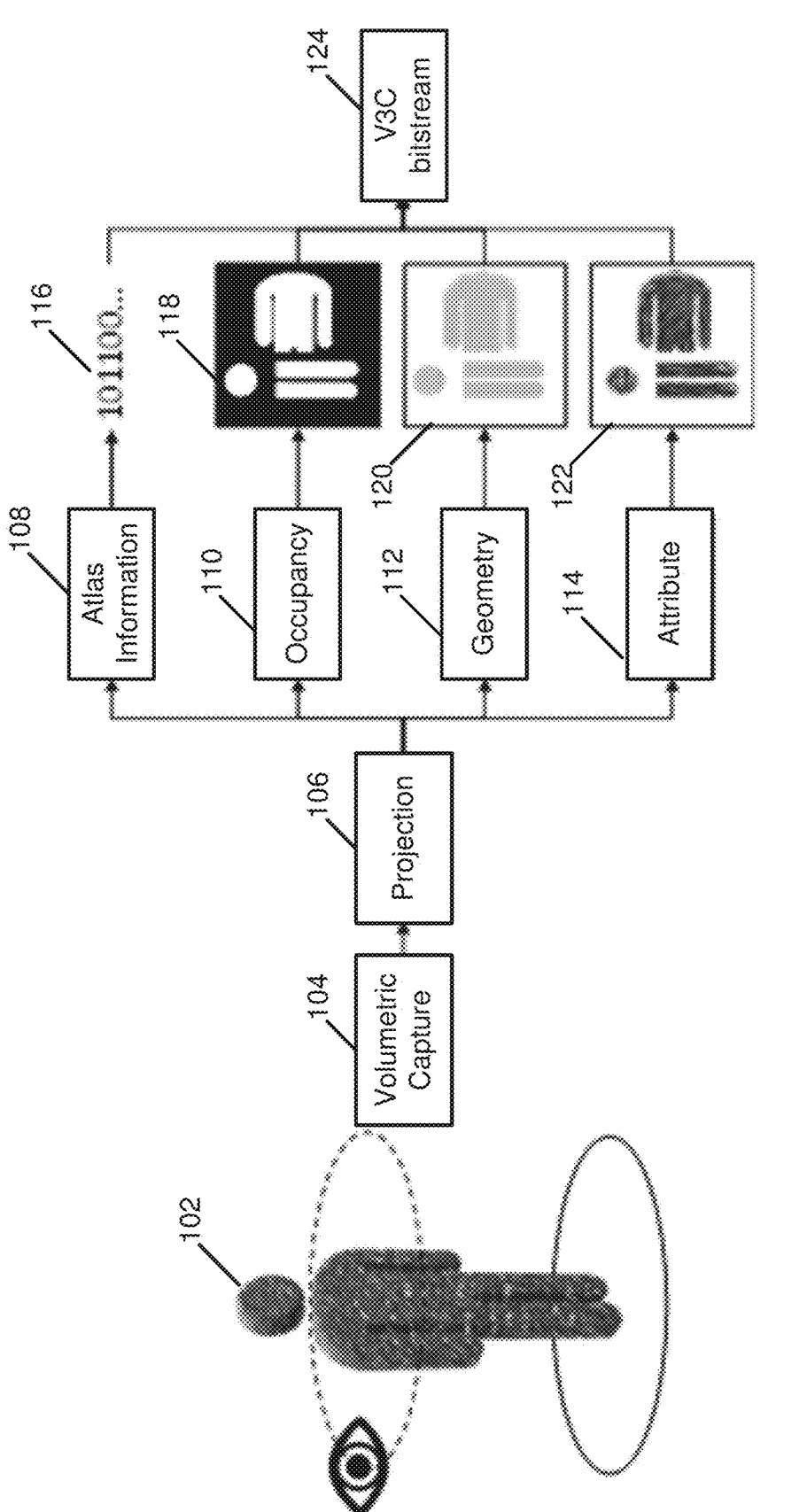
FIG. 1A is a diagram showing volumetric media conversion at an encoder side.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The examples described herein relate to the encoding, signaling and rendering of a volumetric video that is based on mesh coding. Exemplary embodiments herein focus on methods improving the quality of reconstructed mesh surfaces in visual volumetric video-based coding. Exemplary embodiments disclose methods to improve quality of decoded mesh textures and geometry by using their hierarchical representation, which in consequence increase compression efficiency of the encoding pipeline.

For ease of reference, the rest of this document is divided into sections. The section headings are merely exemplary and not intended to be limiting.

I. Introduction to the Technological Area

This part has an introduction to the technological area.

I.A. Volumetric Video Data

Volumetric video data represents a three-dimensional scene or object and can be used as input for AR, VR and MR applications. Such data describes geometry (e.g., shape, size, position in 3D-space) and respective attributes (e.g., color, opacity, reflectance, and the like), plus any possible temporal transformations of the geometry and attributes at given time instances (such as frames in 2D video). Volumetric video is either generated from 3D models, i.e., CGI, or captured from real-world scenes using a variety of capture solutions, e.g., multi-camera, laser scan, combination of video and dedicated depth sensors, and more. Also, a combination of CGI and real-world data is possible. Typical representation formats for such volumetric data are triangle meshes, point clouds, or voxels. Temporal information about the scene can be included in the form of individual capture instances, i.e., "frames" in 2D video, or other means, e.g., position of an object as a function of time.

Because volumetric video describes a 3D scene (or object), such data can be viewed from any viewpoint. Therefore, volumetric video is an important format for AR, VR, or MR applications, especially for providing 6DOF viewing capabilities.

Increasing computational resources and advances in 3D data acquisition devices have enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications such as capturing real world 3D scenes, where the topology is not necessarily a 2D manifold. Another way to represent 3D data is coding this 3D data as a set of textures and a depth map as is the case in the multi-view plus depth framework. Closely related to the techniques used in multi-view plus depth is the use of elevation maps, and multi-level surface maps.

I.B. MPEG Visual Volumetric Video-Based Coding (V3C)

Selected excerpts from the ISO/IEC 23090-5 Visual Volumetric Video-based Coding and Video-based Point Cloud Compression 2nd Edition standard are referred to herein.

Visual volumetric video, a sequence of visual volumetric frames, if uncompressed, may be represented by a large amount of data, which can be costly in terms of storage and transmission. This has led to the need for a high coding efficiency standard for the compression of visual volumetric data.

The V3C specification enables the encoding and decoding processes of a variety of volumetric media by using video and image coding technologies. This is achieved through first a conversion of such media from their corresponding 3D representation to multiple 2D representations, also referred to as V3C components, before coding such information. Such representations may include occupancy, geometry, and attribute components. The occupancy component can inform a V3C decoding and/or rendering system of which samples in the 2D components are associated with data in the final 3D representation. The geometry component contains information about the precise location of 3D data in space, while attribute components can provide additional properties, e.g., texture or material information, of such 3D data. An example is shown in FIG. 1A and FIG. 1B.

Figure 1B:
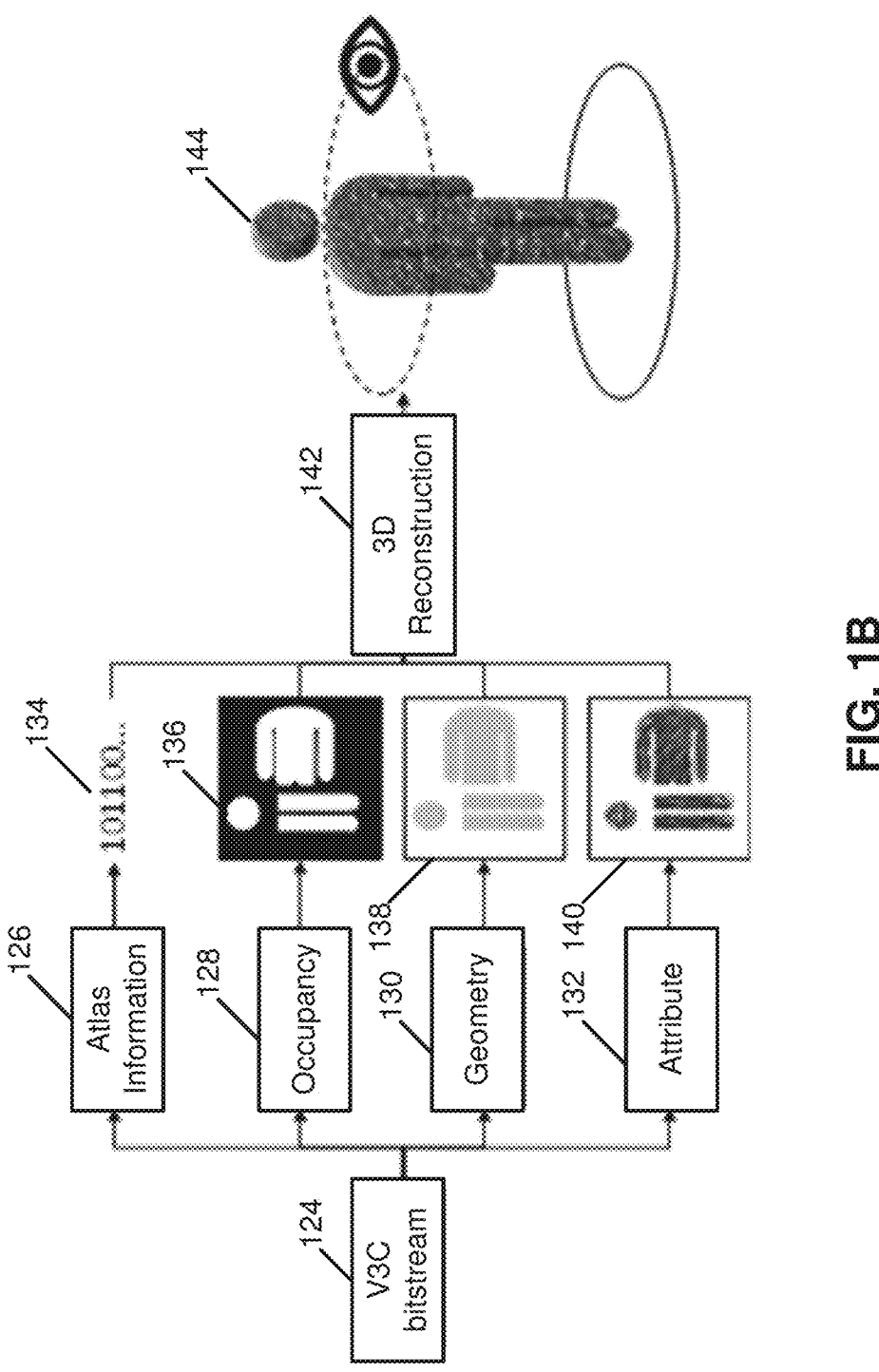
FIG. 1B is a diagram showing volumetric media reconstruction at a decoder side.

FIG. 1A shows volumetric media conversion at the encoder, and FIG. 1B shows volumetric media conversion at the decoder side. The 3D media 102 is converted to a series of 2D representations: occupancy 118, geometry 120, and attribute 122. Additional atlas information 108 is also included in the bitstream to enable inverse reconstruction. Refer to ISO/IEC 23090-5.

As further shown in FIG. 1A, a volumetric capture operation 104 generates a projection 106 from the input 3D media 102. In some examples, the projection 106 is a projection operation. From the projection 106, an occupancy operation 110 generates the occupancy 2D representation 118, a geometry operation 112 generates the geometry 2D representation 120, and an attribute operation 114 generates the attribute 2D representation 122. The additional atlas information 108 is included in the bitstream 116. The atlas information 108, the occupancy 2D representation 118, the geometry 2D representation 120, and the attribute 2D representation 122 are encoded into the V3C bitstream 124 to encode a compressed version of the 3D media 102.

As shown in FIG. 1B, a decoder using the V3C bitstream 124 derives 2D representations using an occupancy operation 128, a geometry operation 130 and an attribute operation 132. The atlas information operation 126 provides atlas information into a bitstream 134. The occupancy operation 128 derives the occupancy 2D representation 136, the geometry operation 130 derives the geometry 2D representation 138, and the attribute operation 132 derives the attribute 2D representation 140. The 3D reconstruction operation 142 generates a decompressed reconstruction 144 of the 3D media 102, using the atlas information 126/134, the occupancy 2D representation 136, the geometry 2D representation 138, and the attribute 2D representation 140.

Additional information that allows associating all these subcomponents and enables the inverse reconstruction, from a 2D representation back to a 3D representation, is also included in a special component, referred to herein as the atlas. An atlas includes multiple elements, namely patches. Each patch identifies a region in all available 2D components and contains information necessary to perform the appropriate inverse projection of this region back to the 3D space. The shape of such regions is determined through a 2D bounding box associated with each patch as well as their coding order. The shape of these regions is also further refined after the consideration of the occupancy information.

Figure 2:
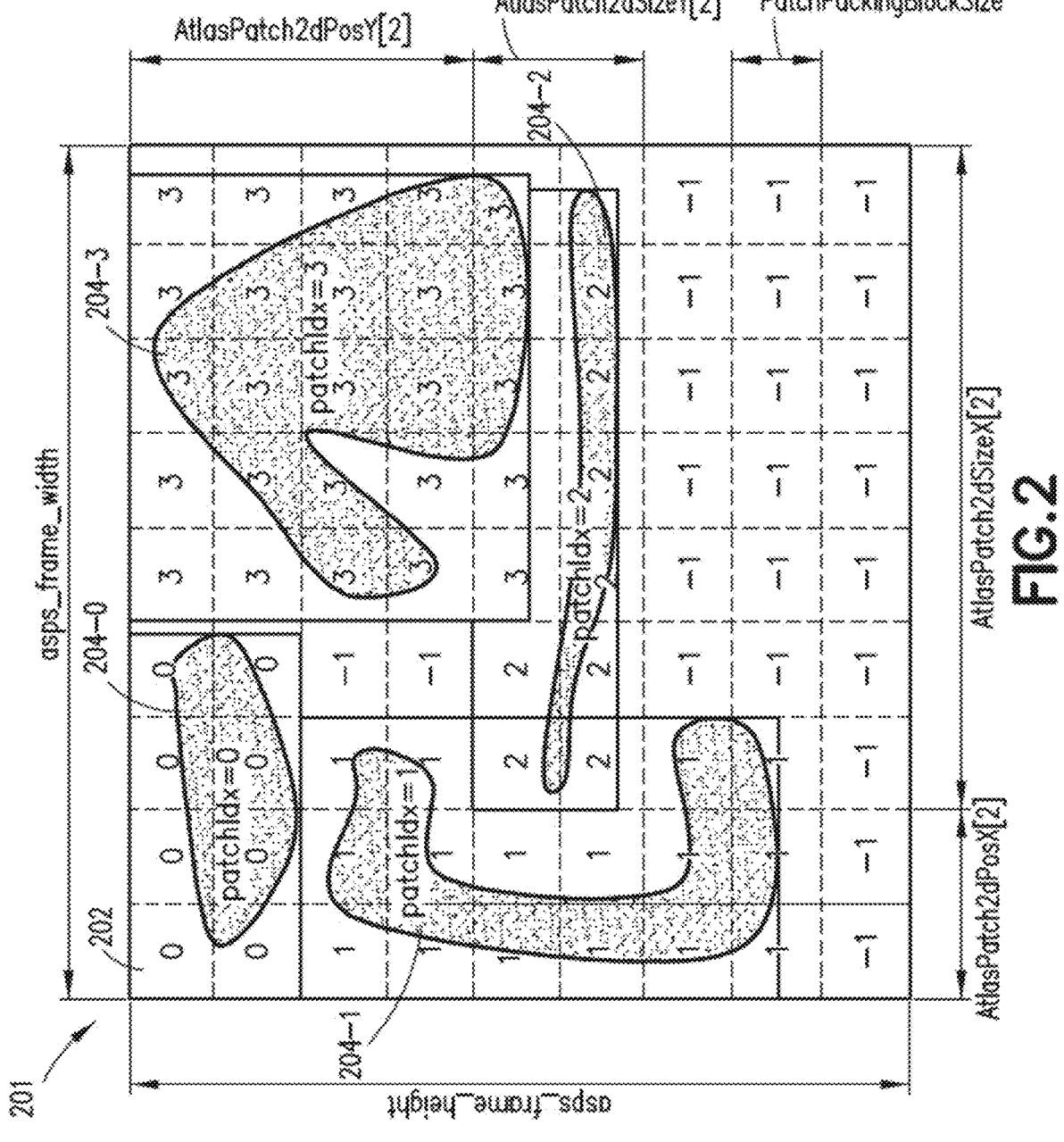
FIG. 2 shows an example of block to patch mapping.

Atlases are partitioned into patch-packing blocks of equal size. Refer for example to block 202 in FIG. 2, where FIG. 2 shows an example of block to patch mapping. The 2D bounding boxes of patches and their coding order determine the mapping between the blocks of the atlas image and the patch indices. FIG. 2 shows an example of block-to-patch mapping with 4 projected patches (204-0, 204-1, 204-2, 204-3) onto an atlas 201 when asps_patch_precedence_order_flag is equal to 0. Projected points are represented with dark gray. The area that does not contain any projected points is represented with light grey. In further detail, the light grey is the area of a given patch marked by a value that corresponds to patchIdx. As the patches are extracted from the atlas in a predefined order, the patchIdx=2 (as an example) can overlap patch with patchIdx=1. See where the set of 18 blocks with patchIdx=1 has two blocks with "2" in them. The darker grey shows the useful information of the patch, which is used during reconstruction process. The darker grey areas are known based on occupancy information. The "[2]" is indicating an index in the array, e.g., AtlasPatch2dPosy [patchIdx]. Patch packing blocks 202 are represented with dashed lines. The number inside each patch packing block 202 represents the patch index of the patch (204-0, 204-1, 204-2, 204-3) to which it is mapped.

Axes orientations are specified for internal operations. For instance, the origin of the atlas coordinates is located on the top-left corner of the atlas frame. For the reconstruction step, an intermediate axes definition for a local 3D patch coordinate system is used. The 3D local patch coordinate system is then converted to the final target 3D coordinate system using appropriate transformation steps.

Figure 3A:
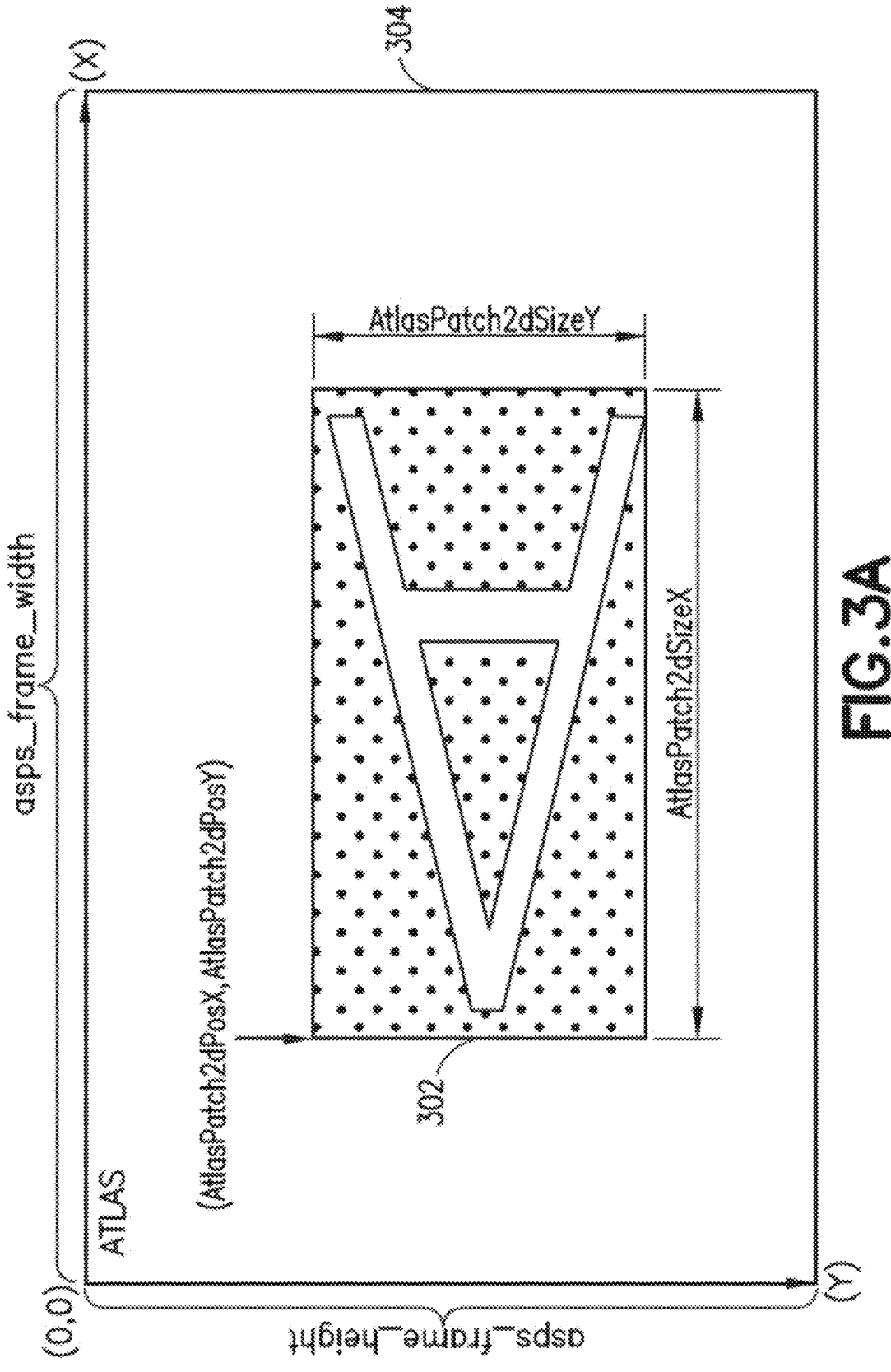
FIG. 3A shows an example of an atlas coordinate system.
Figure 3C:
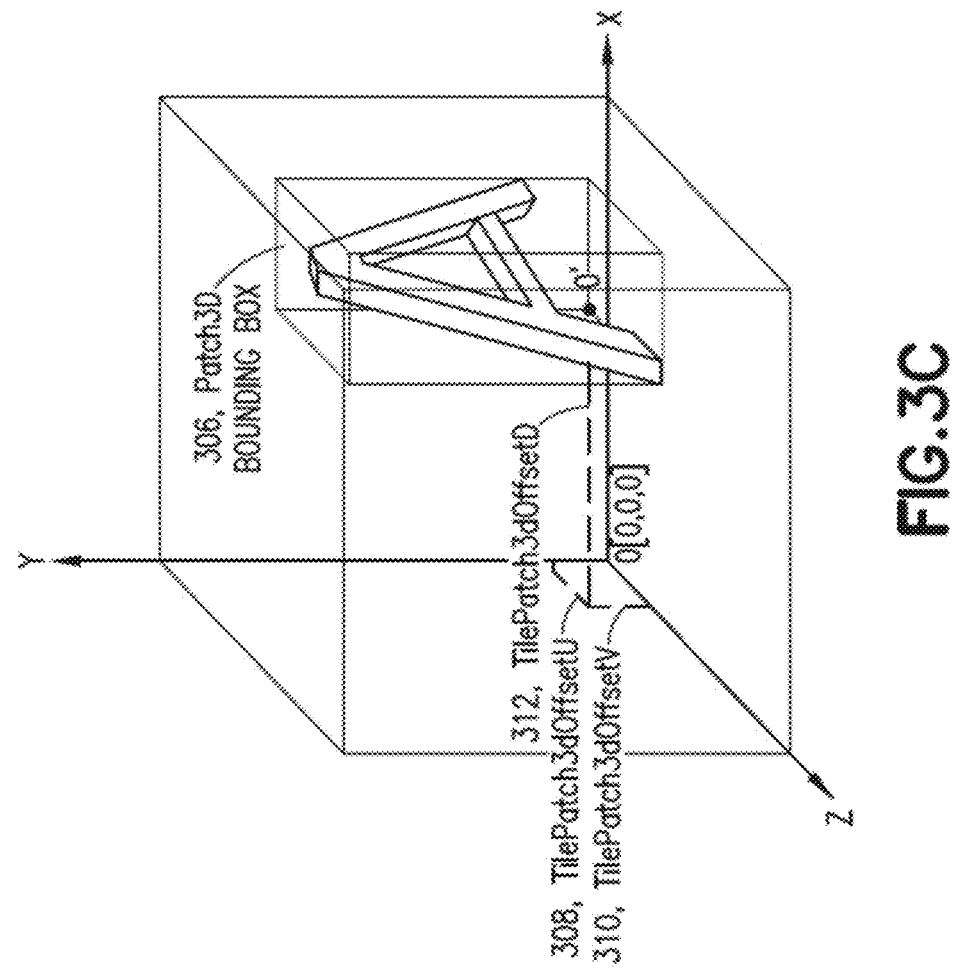
FIG. 3C shows an example of a final target 3D coordinate system.
Figure 3B:
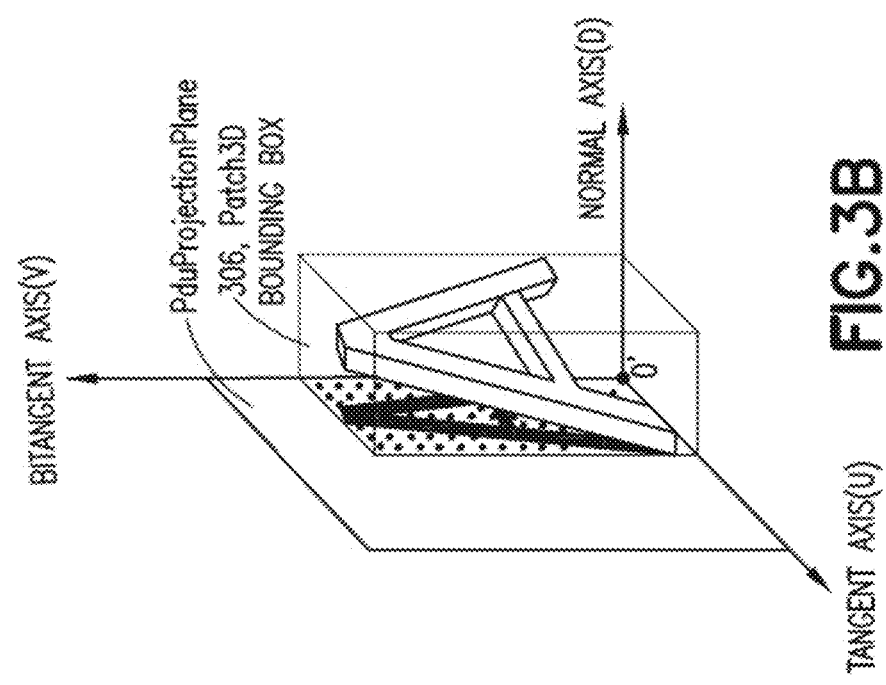
FIG. 3B shows an example of a local 3D patch coordinate system.

FIG. 3A shows an example of an atlas coordinate system, FIG. 3B shows an example of a local 3D patch coordinate system, and FIG. 3C shows an example of a final target 3D coordinate system. Refer to ISO/IEC 23090-5.

FIG. 3A shows an example of a single patch 302 packed onto an atlas image 304. This shows the beginning X and Y locations (AtlasPatch2sPosX and AtlasPatch2sPosY, respectively) and sizes in the X and Y dimensions (AtlasPatch2d-SizeX and AtlasPatch2dSizeY, respectively). This patch 302 is then converted, with reference to FIG. 3B, to a local 3D patch coordinate system (U, V, D) defined by the projection plane with origin O', tangent (U), bi-tangent (V), and normal (D) axes. For an orthographic projection, the projection plane is equal to the sides of an axis-aligned 3D bounding box 306, as shown in FIG. 3B. The location of the bounding box 306 in the 3D model coordinate system, defined by a left-handed system with axes (X, Y, Z), can be obtained by adding offsets TilePatch3dOffsetU 308, TilePatch3DOffsetV 310, and TilePatch3DOffsetD 312, as illustrated in FIG. 3C.

I.C. V3C High Level Syntax

Coded V3C video components are referred to herein as video bitstreams, while an atlas component is referred to as the atlas bitstream. Video bitstreams and atlas bitstreams may be further split into smaller units, referred to herein as video and atlas sub-bitstreams, respectively, and may be interleaved together, after the addition of appropriate delimiters, to construct a V3C bitstream.

V3C patch information is contained in an atlas bitstream, atlas_sub_bitstream ( ) which contains a sequence of NAL units. A NAL unit is specified to format data and provide header information in a manner appropriate for conveyance on a variety of communication channels or storage media. All data are contained in NAL units, each of which contains an integer number of bytes. A NAL unit specifies a generic format for use in both packet-oriented and bitstream systems. The format of NAL units for both packet-oriented transport and sample streams is identical, except that in the sample stream format specified in Annex D of ISO/IEC 23090-5, each NAL unit can be preceded by an additional element that specifies the size of the NAL unit.

NAL units in an atlas bitstream can be divided into atlas coding layer (ACL) and non-atlas coding layer (non-ACL) units. The former is dedicated to carry patch data, while the latter is dedicated to carry data necessary to properly parse the ACL units or any additional auxiliary data.

In the nal_unit_header ( ) syntax, nal_unit_type specifies the type of the RBSP data structure contained in the NAL unit as specified in Table 4 of ISO/IEC 23090-5. nal_layer_id specifies the identifier of the layer to which an ACL NAL unit belongs or the identifier of a layer to which a non-ACL NAL unit applies. The value of nal_layer_id shall be in the range of 0 to 62, inclusive. The value of 63 may be specified in the future by ISO/IEC. Decoders conforming to a profile specified in Annex A of ISO/IEC 23090-5 shall ignore (i.e., remove from the bitstream and discard) all NAL units with values of nal_layer_id not equal to 0.

I.D. V3C Extension Mechanisms

While designing the V3C specification, it was envisaged that amendments or new editions can be created in the future. In order to ensure that the first implementations of V3C decoders are compatible with any future extension, a number of fields for future extensions to parameter sets were reserved.

For example, the second edition of V3C introduced extensions in VPS related to MIV and the packed video component, as shown below, where the right column is a column of descriptors:

```
. . .
   vps_extension_present_flag                               u(1)
   if( vps_extension_present_flag ) {
      vps_packing_information_present_flag                  u(1)
      vps_miv_extension_present_flag                        u(1)
      vps_extension_6bits                                   u(6)
   }
   if( vps_packing_information_present_flag ) {
      for( k = 0 ; k <= vps_atlas_count_minus1; k++ ) {
         j = vps_atlas_id[ k ]
         vps_packed_video_present_flag[ j ]
         if( vps_packed_video_present_flag[ j ] )
            packing_information( j )
      }
   }
   if( vps_miv_extension_present_flag )
      vps_miv_extension( ) /*Specified in ISO/IEC 23090-12 */
   if( vps_extension_6bits ) {
      vps_extension_length_minus1                           ue(v)
      for( j = 0; j < vps_extension_length_minus1 + 1; j++ ) {
         vps_extension_data_byte                            u(8)
      }
   }
   byte_alignment( )
}
```

I.E. Rendering and Meshes

A polygon mesh is a collection of vertices, edges and faces that defines the shape of a polyhedral object in 3D computer graphics and solid modeling. The faces usually consist of triangles (triangle mesh), quadrilaterals (quads), or other simple convex polygons (n-gons), since this simplifies rendering, but may also be more generally composed of concave polygons, or even polygons with holes.

Figure 4:
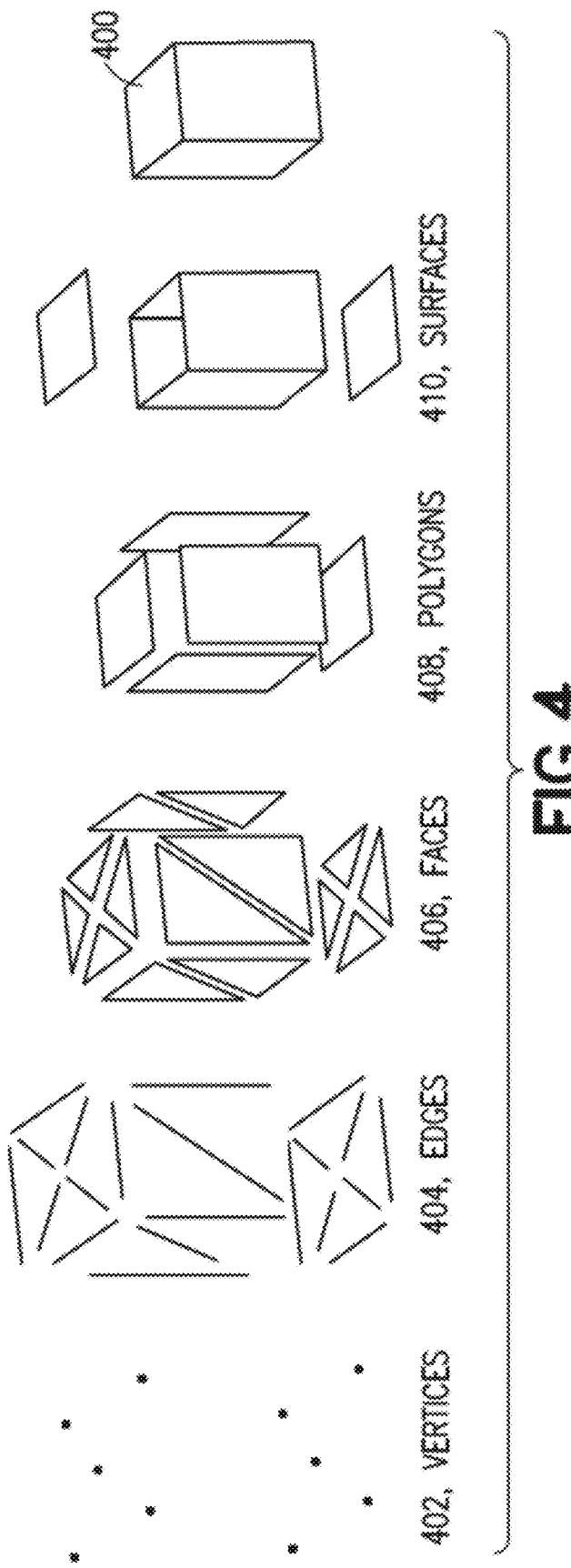
FIG. 4 shows elements of a mesh.

With reference to FIG. 4, objects 400 created with polygon meshes are represented by different types of elements. These include vertices 402, edges 404, faces 406, polygons 408 and surfaces 410 as shown in FIG. 4. Thus, FIG. 4 illustrates elements of a mesh.

Polygon meshes are defined by the following elements.

Vertex (402): a position in 3D space defined as (x,y,z) along with other information such as color (r.g.b), normal vector and texture coordinates.

Edge (404): a connection between two vertices.

Face (406): a closed set of edges 404, in which a triangle face has three edges, and a quad face has four edges. A polygon 408 is a coplanar set of faces 406. In systems that support multi-sided faces, polygons and faces are equivalent. Mathematically, a polygonal mesh may be considered an unstructured grid, or undirected graph, with additional properties of geometry, shape and topology.

Surfaces (410): or smoothing groups, are useful, but not required to group smooth regions.

Groups: some mesh formats contain groups, which define separate elements of the mesh, and are useful for determining separate sub-objects for skeletal animation or separate actors for non-skeletal animation.

Materials: defined to allow different portions of the mesh to use different shaders when rendered.

UV coordinates: most mesh formats also support some form of UV coordinates, which are a separate 2D representation of the mesh "unfolded" to show what portion of a 2-dimensional texture map to apply to different polygons of the mesh. It is also possible for meshes to contain other such vertex attribute information such as color, tangent vectors, weight maps to control animation, and the like (sometimes also called channels).

I.F. V-PCC Mesh Coding Extension (MPEG M49588)

Figure 5:
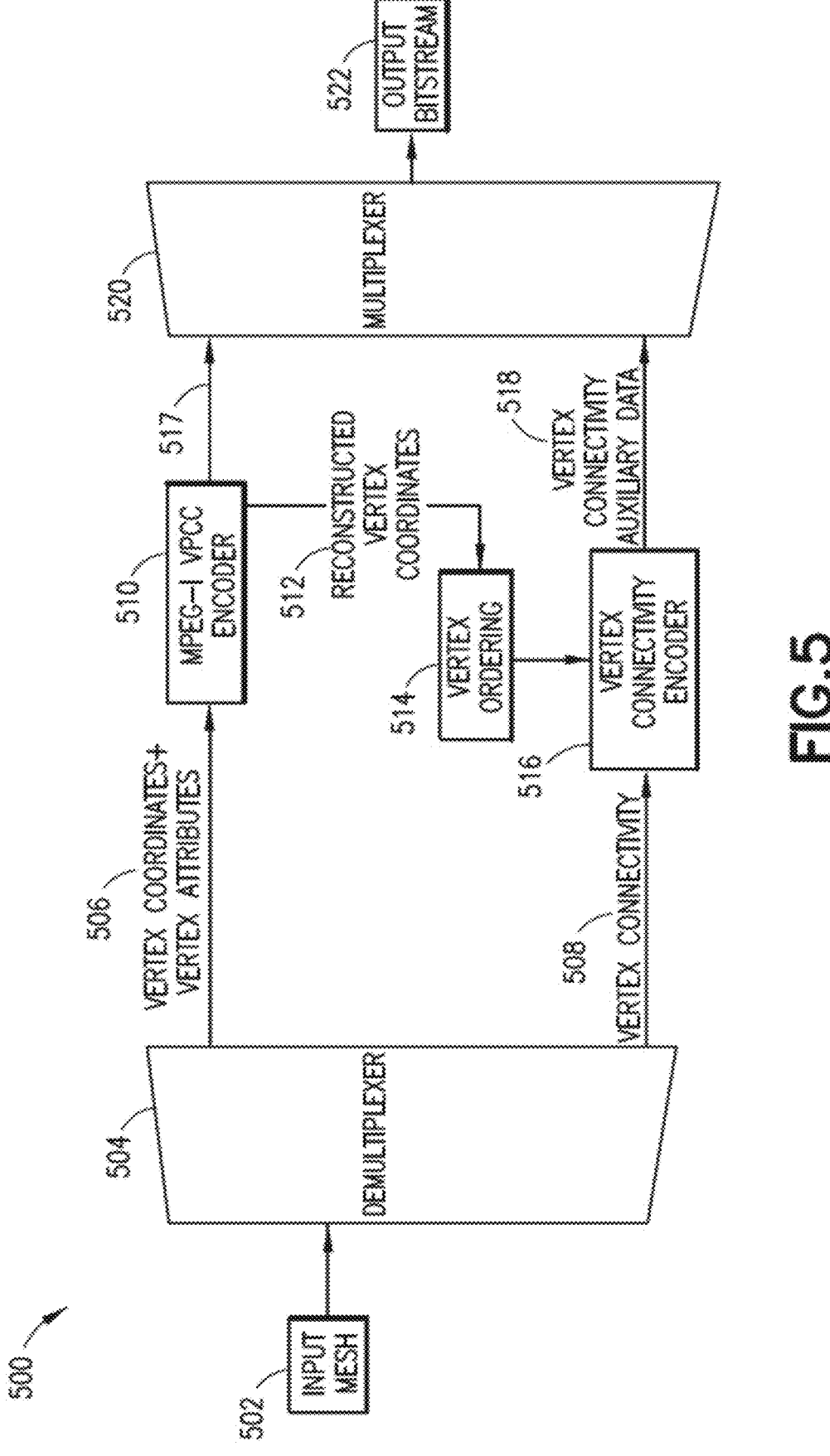
FIG. 5 shows an example V-PCC extension for mesh encoding, based on the embodiments described herein.
Figure 6:
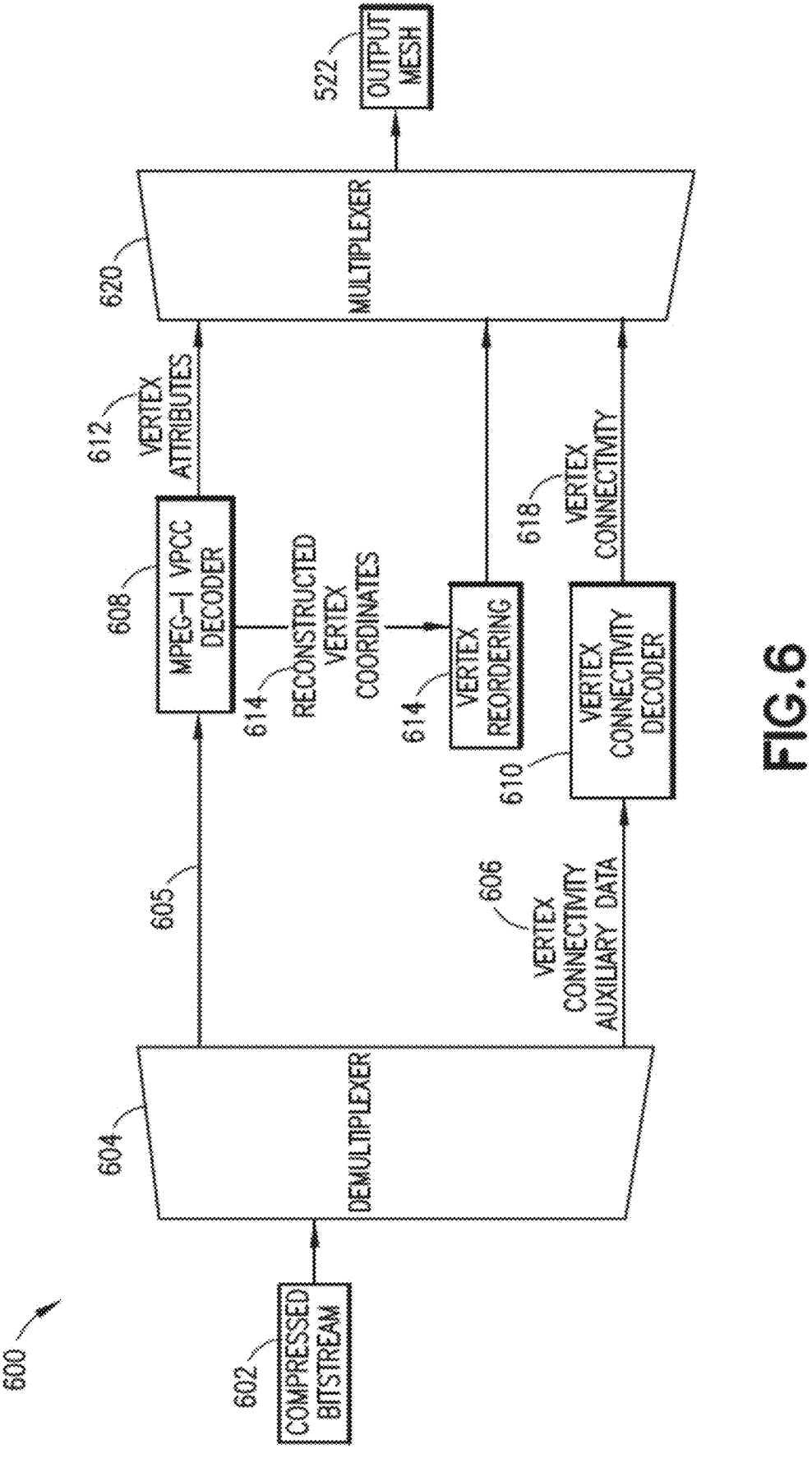
FIG. 6 shows an example V-PCC extension for mesh decoding, based on the embodiments described herein.

FIGS. 5 and 6 show the extensions to the V-PCC encoder and decoder to support mesh encoding and mesh decoding, respectively, as proposed in MPEG input document [MPEG M47608].

In FIG. 5, in the encoder extension (e.g., encoder 500), the input mesh data 502 is demultiplexed with demultiplexer 504 into vertex coordinates+attributes 506 and vertex connectivity 508. The vertex coordinates+attributes 506 is coded using MPEG-I V-PCC (such as with MPEG-I VPCC encoder 510), whereas the vertex connectivity data 508 is coded (using vertex connectivity encoder 516) as auxiliary data 518. Both of these (encoded vertex coordinates and vertex attributes 517 and auxiliary data 518) are multiplexed using multiplexer 520 to create the final compressed output bitstream 522. Vertex ordering 514 is carried out on the reconstructed vertex coordinates 512 at the output of MPEG-I V-PCC 510 to reorder the vertices for optimal vertex connectivity encoding via encoder 516.

As shown in FIG. 6, in the decoder 600, the input compressed bitstream 602 is demultiplexed with demultiplexer 604 to generate the compressed bitstreams for vertex coordinates+attributes 605 and vertex connectivity auxiliary data 606. The input compressed bitstream 602 may comprise or may be the output from the encoder 500, namely the output bitstream 522 of FIG. 5. The vertex coordinates+attributes data 605 is decompressed using MPEG-I V-PCC decoder 608 to generate vertex attributes 612. Vertex reordering 616 is carried out on the reconstructed vertex coordinates 614 at the output of MPEG-I V-PCC decoder 608 to match the vertex order at the encoder 500. The vertex connectivity data 606 is also decompressed using vertex connectivity decoder 610 to generate vertex connectivity information 618, and everything (including vertex attributes 612, the output of vertex reordering 616, and vertex connectivity information 618) is multiplexed with multiplexer 620 to generate the reconstructed mesh 622.

I.G. Generic Mesh Compression

Mesh data may be compressed directly without projecting it into 2D-planes, as in V-PCC based mesh coding. In fact, the anchor for V-PCC mesh compression call for proposals (CfP) utilizes off-the shelf mesh compression technology, Draco (found at google.github.io/draco/) is an open-course library for compressing mesh data excluding textures. Draco is used to compress vertex positions in 3D, connectivity data (faces) as well as UV coordinates. Additional per-vertex attributes may be also compressed using Draco. The actual UV texture may be compressed using traditional video compression technologies, such as H.265 or H.264.

Draco uses the edgebreaker algorithm at its core to compress 3D mesh information. Draco offers a good balance between simplicity and efficiency, and is part of Khronos endorsed extensions for the glTF specification. The main idea of the algorithm is to traverse mesh triangles in a deterministic way so that each new triangle is encoded next to an already encoded triangle. This enables prediction of vertex specific information from the previously encoded data by simply adding delta to the previous data. Edgebreaker utilizes symbols to signal how each new triangle is connected to the previously encoded part of the mesh. Connecting triangles in such a way results on average in 1 to 2 bits per triangle when combined with existing binary encoding techniques.

I.H. Exemplary Issues in the Conventional Technology

The geometry atlas component generated from the dynamic mesh describes patches without connectivity information. The decoder (e.g., 608) can convert each patch encoded and provided by the geometry component into a submesh by triangulating the vertices, or subset of vertices, of the decoded depth map (a geometry component). However, due to distortion caused by depth quantization and lossy video coding, reconstructed submesh borders, generated from the patches, do not exactly match with neighboring patch submesh borders. It follows that the result of the patch triangulation process leads to a set of disconnected submeshes with visible holes between them as illustrated on FIG. 7.

Figure 7:
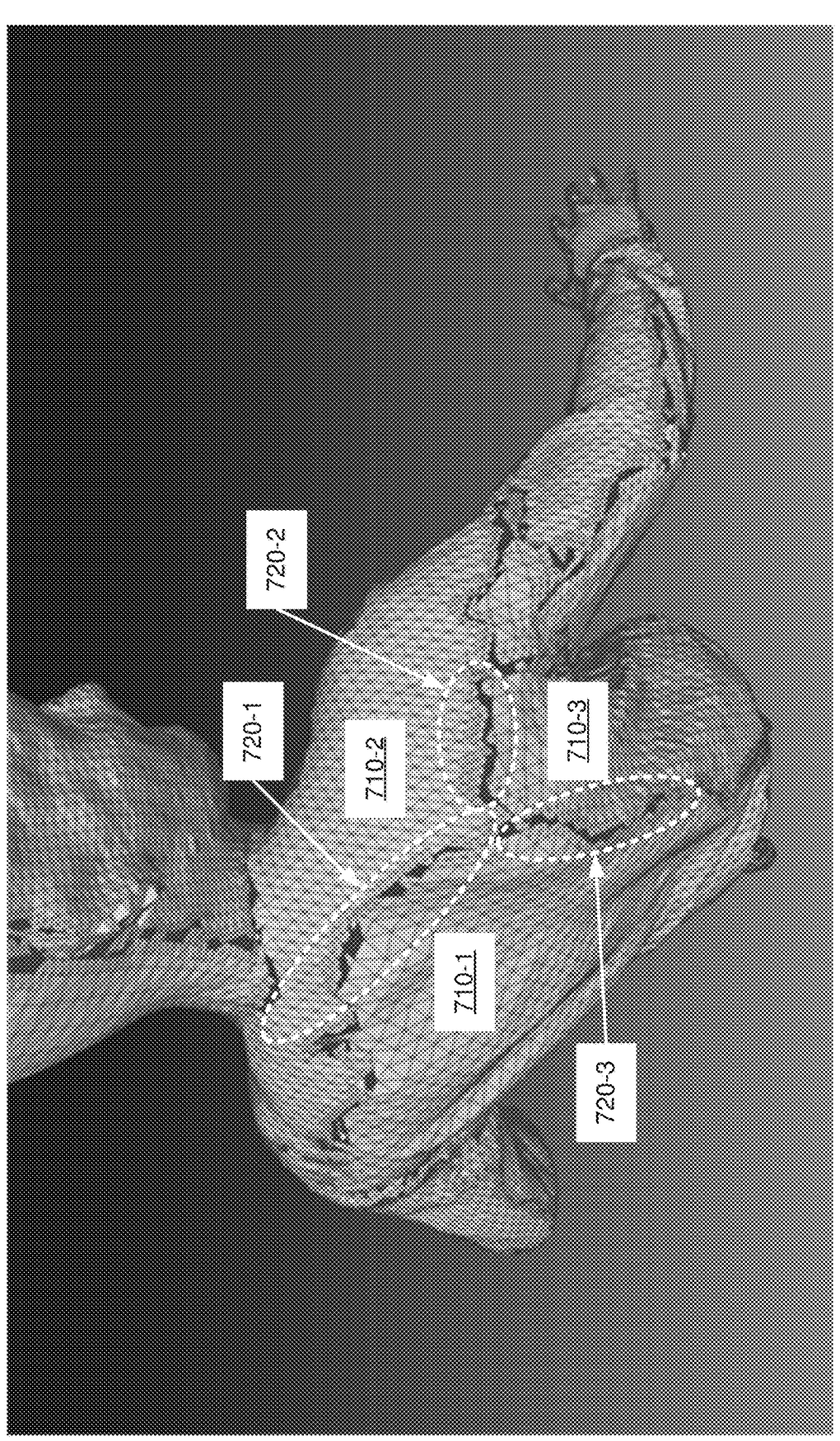
FIG. 7 illustrates mesh reconstructed from patches and exhibiting holes between patch borders.

FIG. 7 illustrates multiple submeshes 710, of which only three are discussed. Submesh 710-1 has two borders that do not mesh well with submeshes 710-2 and 710-3, as illustrated by references 720-1 and 720-3 and the corresponding gaps. Similarly, the submesh 710-3 does not mesh well with submesh 710-2, as indicated by reference 720-2 and the corresponding gaps.

The V3C-based dynamic mesh encoder (e.g., 510) produces patches that provide a segmentation of the original mesh such that a face belongs to at most one patch, while vertices may belong to more than one patch. Such vertices that belong to more than one patch are called boundary or edge vertices. After the process of depth map (a geometry component) creation and atlas packing, each patch local surface is resampled with typically more 3D points than the original vertex, and if vertex distribution mapping is used at the encoder, the sampling rate may differ between neighboring patches. It follows that a boundary vertex in the original mesh at a 3D location (x,y,z), which belongs to several patches P (p1,p2, . . . ), may be approximated in each patch it belongs to, by a number of points (e.g., Np1, Np2, Np3 . . . ) that are close to the original 3D position (x,y,z), and that the numbers of these corresponding points (Np1, Np2, Np3 . . . ) may differ. Blending together these neighboring patches at location (x.y,z) of the original boundary vertex is therefore not a straightforward issue of finding one-to-one closest pairs (or tuples) of points between patch borders as illustrated on FIG. 8.

Figure 8:
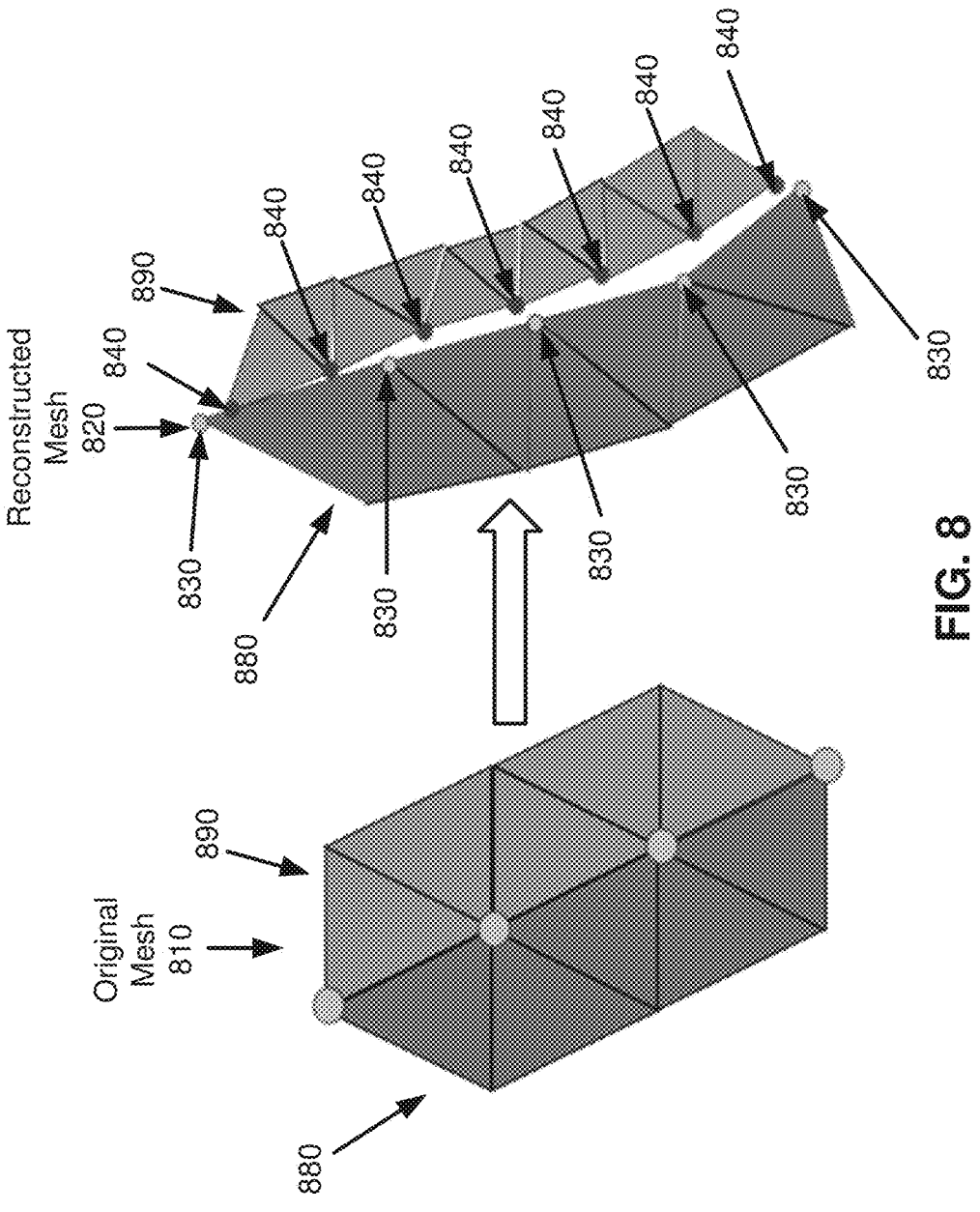
FIG. 8 illustrates that patch-centric resampling may lead to different sets of boundary vertices in the reconstructed mesh compared to the original mesh.

FIG. 8 indicates that patch-centric resampling may lead to different sets of boundary vertices in the reconstructed mesh compared to the original mesh. On the left, in the original mesh 810, boundary vertices between two neighboring patches with dark (patch 880) and light (patch 890) grey faces respectively are represented with large dots. On the right, an example of a possible reconstruction (reconstructed mesh 820) of the same area between the two neighboring patches 880/890, with boundary vertices of the dark grey patch 880 being represented using reference 830, and the boundary vertices of the light grey patch 890 being represented using reference 840. The boundary vertices 830, 840 do not match anymore after reconstruction because of a different sampling per patch and also due to quantization and coding of geometry. Creating new triangles connecting boundary vertices on the reconstructed mesh on the right (such as in inpainting techniques) requires a careful handling of both geometry and texture coordinates.

Geometry of neighboring patches needs to be blended together to reconstruct a mesh whose geometry approximates well the one of the original mesh. Special care needs to be taken as well for texture coordinates since a poor-quality interpolation of texture across blended patches would lead to very visible artifacts. Adding new triangles between patches may therefore lead to errors or low-quality texture mapping locally.

Not all neighboring patches need to be fused together as they could be separated in the original content. This ambiguity is illustrated on FIG. 9 with the case of a hand and fingers which could be wrongly fused together, for example if only a global Euclidian distance criterion is used in the process.

Figure 9:
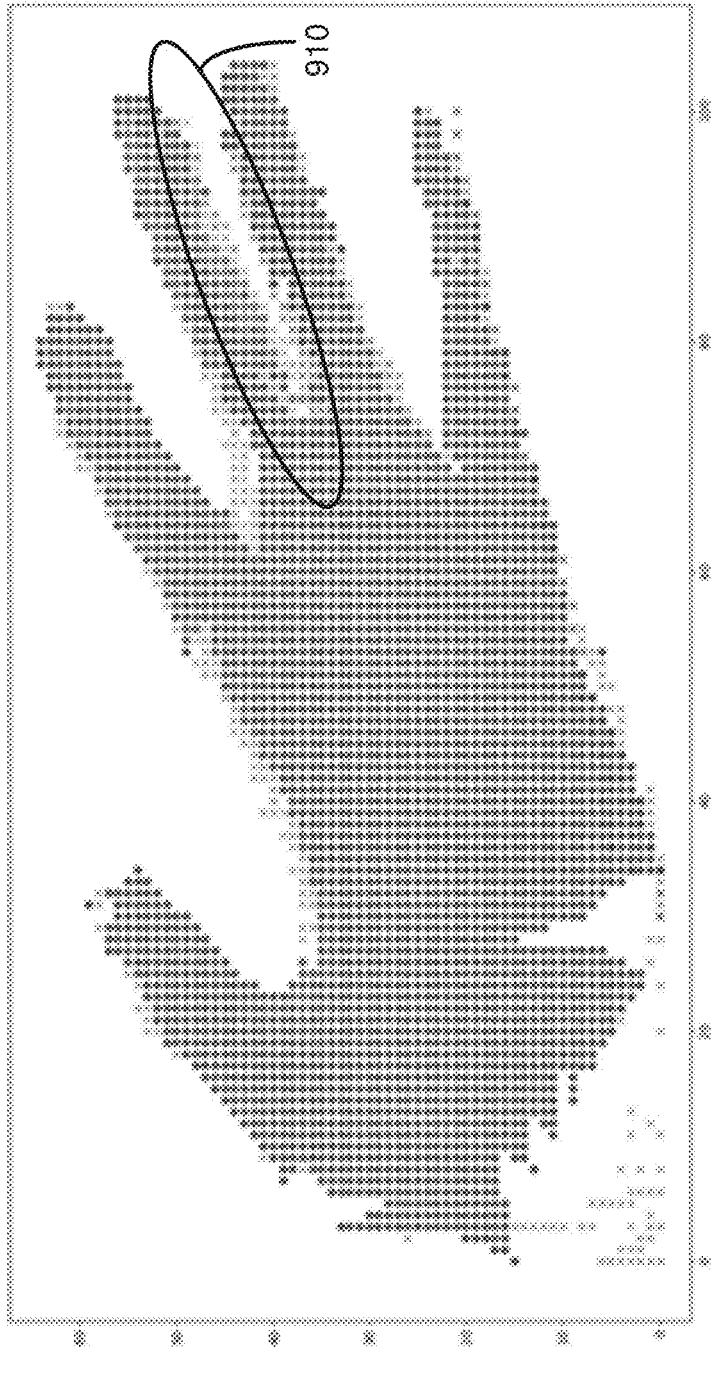
FIG. 9 illustrates patches that segment hands and fingers and bring ambiguities in which patch borders might fuse with each other.

In FIG. 9, there is an illustration of patches that segment hands and fingers and bring ambiguities in which patch borders might fuse with each other. There is an occupancy signal for a patch covering the palm and fingers of a hand. Reprojected boundary vertices of neighboring patches are shown on the hand patch depth map, each neighboring patch having a dedicated different shade. It can be seen via reference 910 that the two middle fingers could easily be fused with each other instead of leading to a natural and correct closing of the finger shapes.

Summarizing exemplary issues with conventional techniques, these issues are as follows.

1) To reconstruct a continuous mesh, patches need to be geometrically blended together, at the decoder-side. Otherwise, such gaps between patches are very visible in rendered views and severely impact the perceived quality of the decoded and reconstructed mesh.

2) It is difficult to identify which borders need to be blended together and which ones should not.

3) Texture coordinates need to be correctly interpolated on the blended geometry for the same reason.

4) Furthermore, the dynamic video playout is supposed to run in real-time in applications using such dynamic meshes; the patch blending should be computationally efficient.

II. Overview of Exemplary Embodiments

To address some or all of these and potentially other issues, the proposed exemplary embodiments focus on blending together the geometry of these patches so that a smooth continuity between patches is ensured. An exemplary method includes one or more of the following, such that the method:

1) Obtains a mesh representation of a 3D object.

2) Segments the 3D object in the 2D projections comprising geometry, texture, occupancy and possibly other components;

3) Reconstructs the 3D mesh from the segmented 2D projections on the encoder side and blends the reconstructed submeshes together, using curvature-guided patch border fusion, to derive parameters for the inter-patch blending, and those parameters may be considered to be optimal depending on outcome of derivation;

4) Encodes the segmented 2D projections into a V3C bitstream;

5) Signals in or along a V3C bitstream the parameters;

6) Transmits the encoded V3C bitstream with the parameters to the decoder, which performs the blending operations based on steps described herein and the parameters signaled in or along the V3C bitstream. Note that the encoding encodes information for patch data units, each patch data unit corresponding to at least one patch and containing information to describe that at least one patch.

The following examples may be different, alternative embodiments. Alternatively, one or more of the embodiments may be used together.

In one embodiment, the parameters comprise a flag indicating if inter-patch blending parameters are present in the bitstream. In another embodiment, the parameters comprise a syntax element that indicates per-patch if the patch should be blended to one or more neighboring patches using a single distance threshold value.

In another embodiment, the parameters comprise a per-patch inter-patch distance threshold indicator, which can be used to determine when the vertices on the patch edge should be blended to vertices on other patch edges. In another embodiment, the parameters comprise a syntax element that indicates a number of other patches with which the edges in the patch should be blended.

In another embodiment, the parameters comprise one or more patch indices, indicating identifiers for connected patches, and one or more depth distance thresholds, indicating the distance threshold per identified patch, which can be used to determine whether edges between patches should be blended.

III. Additional Exemplary Implementation Details

This section comprises additional implementation details.

Figure 10:
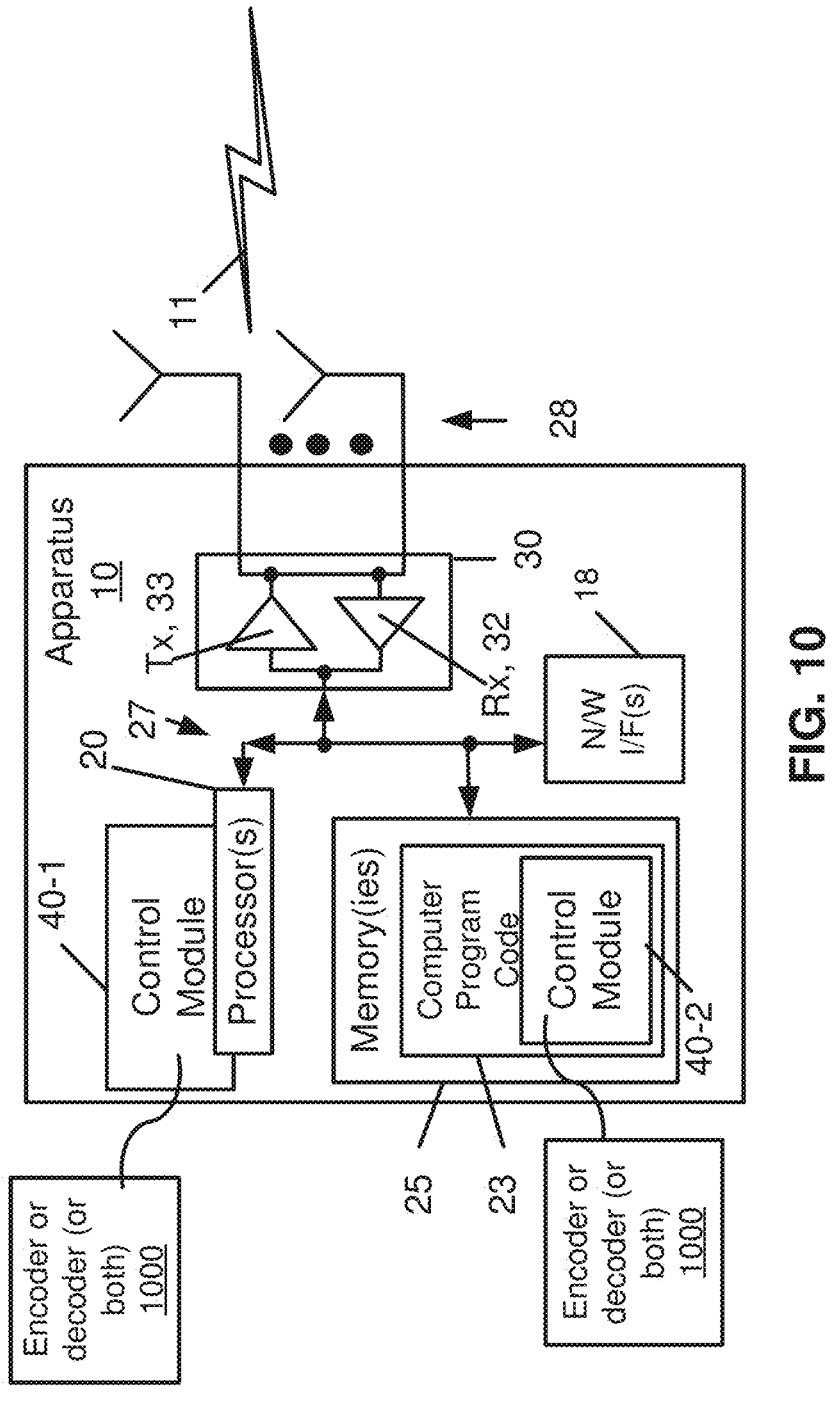
FIG. 10 is a block diagram of an apparatus that may be used for encoding such as by implementing a version of the V-PCC extension for mesh encoding of FIG. 5, or for decoding, such as by implementing a version of the V-PCC extension for mesh decoding of FIG. 6, in accordance with an exemplary embodiment.

Turning to FIG. 10, this figure is a block diagram of an apparatus that may be used for encoding such as by implementing a version of the V-PCC extension for mesh encoding of FIG. 5, or for decoding, such as by implementing a version of the V-PCC extension for mesh decoding of FIG. 6, in accordance with an exemplary embodiment. Apparatus 10 may therefore be used to provide an encoder 1000 or a decoder 1000 (or both) in accordance with exemplary embodiments herein. As such, a modified version of the V-PCC extension for mesh encoding of FIG. 5 or mesh decoding of FIG. 6 may be used. The apparatus 10 includes circuitry comprising one or more processors 20, one or more memories 25, one or more transceivers 30, and one or more network (N/W) interfaces (I/Fs) 18 interconnected through one or more buses 27. Each of the one or more transceivers 30 includes a receiver, Rx, 32 and a transmitter, Tx, 33. The one or more buses 27 may be address, data, or control buses, and may include any interconnection mechanism, such as a series of lines on a motherboard or integrated circuit, fiber optics or other optical communication equipment, and the like. The one or more transceivers 30 are connected to one or more antennas 28. The one or more antennas 28 may communicate via wireless link(s) 11.

The N/W I/F(s) 18 may be "wired" network interfaces, such as USB (universal serial bus) or Ethernet or optical network interfaces, depending on the apparatus 10. The apparatus 10 may be wireless, having one or more of the transceivers 30, wired, having one or more N/W I/F(s) 18, or both.

The one or more memories 25 include computer program code 23. The apparatus 10 includes a control module 40, comprising one of or both parts 40-1 and/or 40-2, which may be implemented in a number of ways. The control module 40 may be implemented in hardware as control module 40-1, such as being implemented as part of the one or more processors 20. The control module 40-1 may be implemented also as an integrated circuit or through other hardware such as a programmable gate array. In another example, the control module 40 may be implemented as control module 40-2, which is implemented as computer program code 23 and is executed by the one or more processors 20. For instance, the one or more memories 25 and the computer program code 23 may be configured to, with the one or more processors 20, cause the apparatus 10 to perform one or more of the operations as described herein. The encoder 1000 or decoder 1000 (or both) may be implemented in the control module 40-1, 40-2, or both 40-1 and 40-2.

The computer readable memories 25 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 25 may be means for performing storage functions. The processors 20 may be of any type suitable to the local technical environment, and may include one or more of general-purpose computers, special purpose computers, microprocessors, digital signal processors (DSPs) and processors based on a multi-core processor architecture, as non-limiting examples. The processors 20 may be means for performing functions, such as controlling an entity to perform functions as described herein. The processors 20 and memories 25 may be distributed, such as in a cloud environment, or may be "singular" such as being contained in one contained set of circuitry (such as a rack server, wireless communication device, computer system, and the like).

FIG. 11, which is split over FIGS. 11A and 11B, is a logic flow diagram for curvature-guided inter-patch 3D inpainting for dynamic mesh coding, in accordance with an exemplary embodiment. FIG. 11 illustrates the operation of an exemplary method, a result of execution of computer program instructions embodied on a computer readable memory, functions performed by logic implemented in hardware, and/or interconnected means for performing functions in accordance with an exemplary embodiment. The blocks in FIG. 11 may be performed by an apparatus 10, e.g., under control of the control module 40 as implemented via an encoder 1000.

Figures 12, 13:
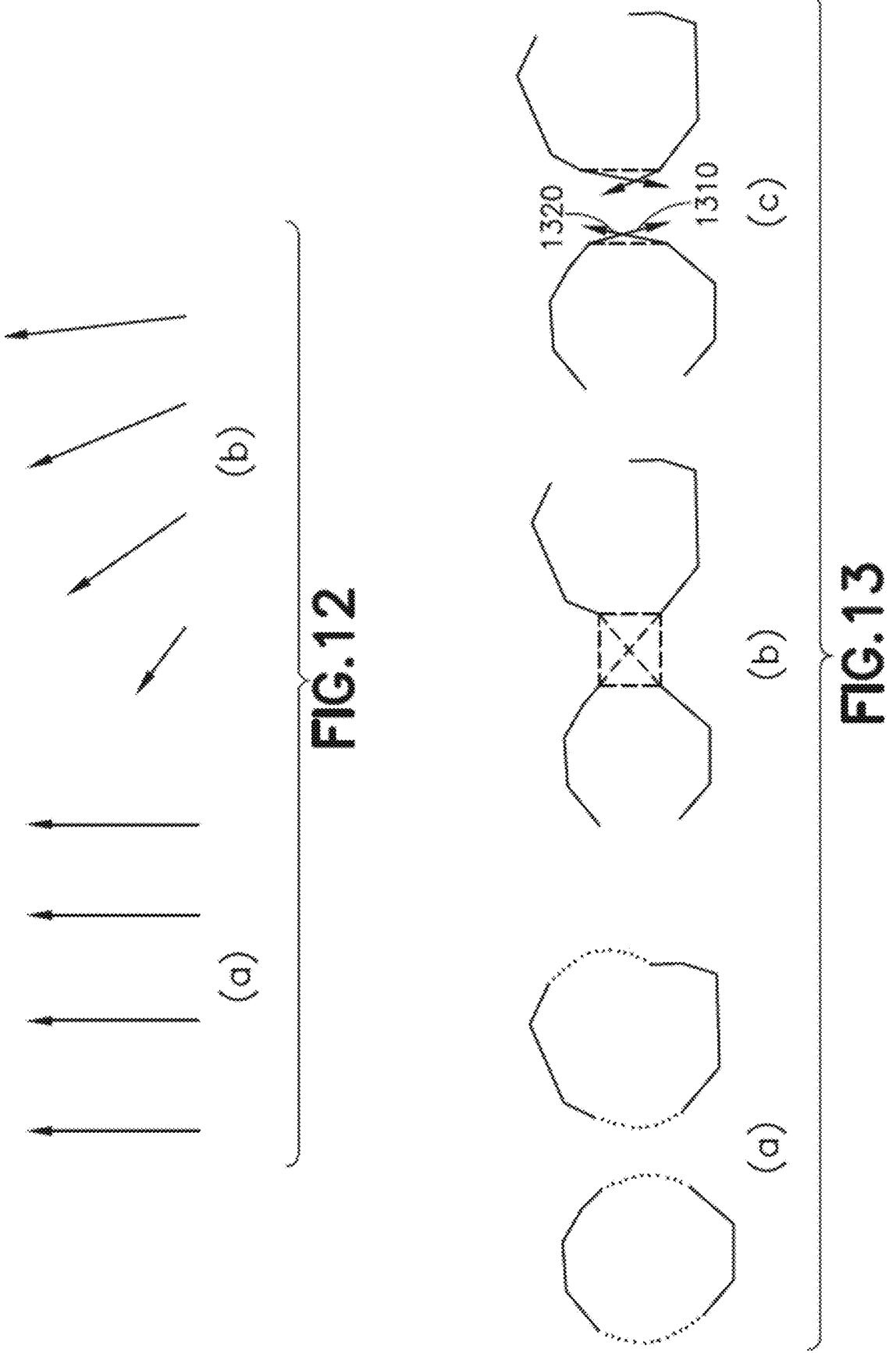
FIG. 12 illustrates an example of normal direction continuity along a direction.
FIG. 13 illustrates selecting boundaries to blend together, in accordance with an exemplary embodiment.

The patch blending method can be based on curvature-guided patch border fusion, i.e., the fusion of submeshes is performed so that the curvature seen across patch borders is continuous and smooth. In order to distinguish between holes that should not be filled and borders that require to be blended together, the method shown in FIG. 11 is presented. Concerning the terms "blending" and "stitching", both these terms are used, often interchangeably, herein. Blending usually means things overlap and something is performed so that the overlapping is invisible. Meanwhile, stitching usually means there is a gap between two regions and the regions are pasted together in a transparent manner. For the times the term "stitching" is used herein, this is not meant to completely exclude blending and may include blending (e.g., as such blending is illustrated in FIG. 13). Similarly, if "blending" is used, this is not meant to exclude, and might instead include, stitching.

The method illustrated in FIG. 11 is part of an encoding process. The method in this example includes the following.

0) An encoding process is performed to at least generate patches for an input mesh (e.g., an input video stream). The encoding process may include many operations, but two are illustrated below.

0.a) A mesh representation is obtained of a 3D object.

0.b) The 3D object is segmented into 2D projections. The term "2D projections" is meant to cover two-dimensional projections to video components, as well as atlas components that contain metadata that allows re-projecting from 2D back into 3D.

The following steps, such as steps 1-4, can be considered to reconstruct a 3D mesh from the segmented 2D projections at least by stitching reconstructed submeshes together at least as patches. For clarity, submeshes and patches can be considered to be the same when used herein. The stitching process begins in step 1, and steps 1 and 2 can be considered to be preparatory for the actual stitching that takes place beginning in step 3.

1) For each patch, neighboring patch boundaries reprojection is used to determine a first set of neighboring border sections that are candidates to be fused with parts of the current patch border.

2) For each boundary vertex of the current patch, the following are performed.

2.a) A set of all candidate neighboring patches vertices that are within a distance d that is smaller than an encoder-defined threshold (there can be more than one threshold per patch) is built.

2.b) For boundary vertices of all candidate neighboring patches, local patch border extrapolation is tested by creating virtual triangles across the border. The vertices of these extrapolated virtual triangles are chosen in such a way that the resulting triangle normal direction maintains normal direction smoothness (see FIG. 12).

Turning briefly to FIG. 12, this figure illustrates an example of normal direction continuity along a direction. On the left in part (a), their normal directions remain the same.

On the right in part (b), the normal directions change along a direction but the angular variation remains constant. In both cases, the differential of the normal vector direction remains constant, which is a feature of smooth curves or surfaces.

These extrapolated triangles are only used with the purpose to select the best neighboring patch border, as illustrated on FIG. 13. Turning to FIG. 13, this figure illustrates selecting boundaries to blend together. Subfigure (a) shows the section of two fingers with upper and bottom patches in plain lines, while dotted edges show inter patch gaps with missing data. Subfigure (b) shows the Euclidian distance criterion to select which borders to fuse with each other is not satisfying, as there is a chance the two fingers may be incorrectly blended together instead of blending the upper and bottom patches of the corresponding finger. Subfigure (c) shows that, using the patch normal direction-based extrapolation as recommended herein, the curvature of the fingers section leads to matching the correct patch borders together. That is, the arrows 1310 and 1320 indicate the two "edges" of the patches for a single finger should be patched together.

In additional detail, the arrows in subfigure (c) do not indicate a normal direction. Rather, these indicate where the surface is expected to be extrapolated if the normal variation of the surface is constant. In an exemplary embodiment, missing parts of a surface are extrapolated in such a way that the obtained reconstructed surface derivatives look similar to the last observed portion of the surface before the cut. For one-dimensional functions, it is as if one predicts the next unknown value with a gradient that is similar to or follows the same variation as the gradients on previously available samples. For surfaces, instead of derivatives or gradients, it is necessary to introduce locally a normal vector, a tangential plane and curvatures. Preserving the normal direction variation is an extension to surfaces of the example given before for one-dimensional functions.

To turn back to FIG. 11, using the normal direction's angular variation from a patch to the other one and vice versa enables to reduce the search space for matching borders where the extrapolated patch borders (constrained by the normal direction variation) cross or come close to each other.

2.c) If ambiguities still remain, the encoder may flag which patch borders can or cannot be fused together per patch.

In block 1110, once at least one neighboring patch border has been selected for each vertex of the current patch boundary, the actual stitching starts (block 1110=Start). If at least one neighboring patch border has not been selected for each vertex of the current patch boundary (block 1110=Select another patch), the flow proceeds to block (1) again.

Figure 14:
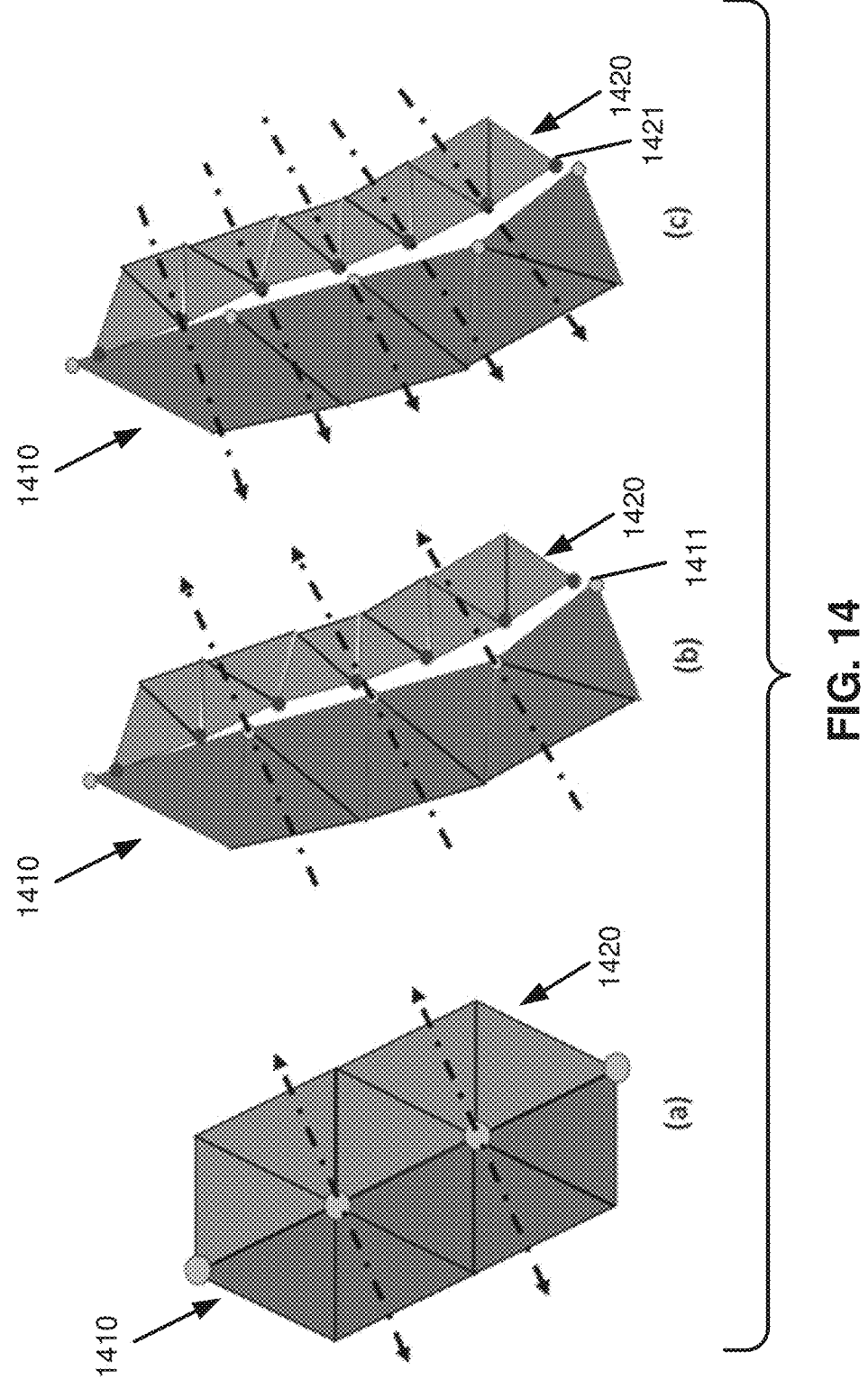
FIG. 14 provides illustration of cross border extrapolation and fusion based on cross border curvature flow, in accordance with an exemplary embodiment.

3) For the blending process, stitching is performed of cross curvature orthogonally to the borders seen from the two patch borders to be fused. This is illustrated on FIG. 14. Turning briefly to FIG. 14, this figure provides illustration of cross border extrapolation and fusion based on cross border curvature flow, in accordance with an exemplary embodiment. Subfigure (a) shows the "before" processing, and the arrows indicate how processing is performed for the patches 1410, 1420 at the corresponding vertices. Subfigure (b) shows that for patch 1410, the arrows at the corresponding vertices indicate stitching is to be performed orthogonally to the border 1411, e.g., toward the patch 1420. Similarly, subfigure (c) shows that for patch 1420, the arrows at the corresponding vertices indicate stitching is to be performed orthogonally to the border 1421, e.g., toward the patch 1410.

3.a) Returning to FIG. 11, each border vertex from the first patch is mapped on the other patch border edges as vertices that lie on edges of the boundary or optionally on faces of the boundary.

3.b) Each border vertex from the other patch is mapped to the first patch as vertices that lie on edges of the boundary or optionally on faces of the boundary.

3.c) Local connectivity is modified to connect these mapped vertices to the other patch vertices as new triangles. In case of vertices mapped inside triangles, part of the triangle is removed so that the mapped vertex lies on the patch border.

Figure 15:
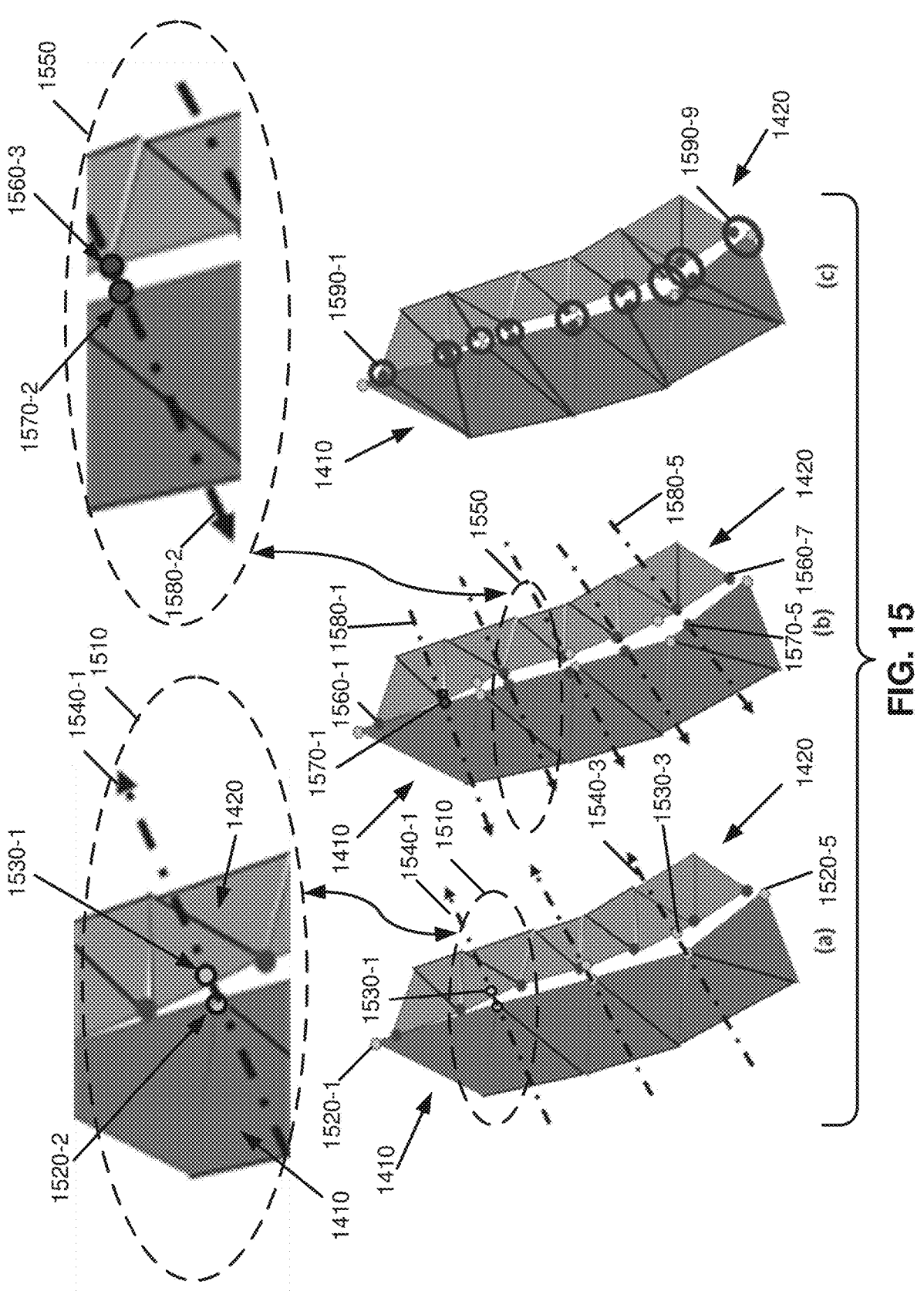
FIG. 15 indicates blending steps in accordance with an exemplary embodiment.

3.d) The pairs of vertices (original and mapped) are then fused together (their 3D position and texture coordinates) as illustrated on FIG. 15, which indicates blending steps in accordance with an exemplary embodiment. Note that for ease of reference, not all reference numbers are shown. In subfigure (a), there are boundary vertices 1520-1 through 1520-5 for the patch 1410. The boundary vertices 1520 are mapped from the current patch 1410 to the selected other boundary patch 1420 following the normal direction flow (as indicated by the arrows 1540-1 to 1540-3) of the current patch. The mapping positions on the boundary edges for patch 1420 define new vertices 1530-1 to 1530-3. Optionally, vertices can be mapped into triangles as well if this leads to a shorter distance between original and mapped vertices. It is noted that vertices 1520-1 and 1520-5 do not have such a mapping, as there is no corresponding boundary in patch 1420. See step 3.e below for how these might be handled. Reference 1510 is used to show an enlarged version for ease of reference. The boundary vertex 1520-2 on patch 1410 is mapped to a new vertex 1530-1 on patch 1420, along the direction of arrow 1540-1. Three arrows 1540-1, 1540-2, and 1540-3 are shown.

Concerning subfigure (b), in the same way, boundary vertices 1560-1 to 1560-7 of the other patch 1420 are mapped to the current patch border for patch 1410 (edges or triangles) also using the normal direction flow but now defined on patch 1420. The arrows 1580-1 through 1580-5 illustrate the arrows and corresponding directions in which the mapping takes place. Mapped vertices on the current patch border define new vertices 1570-1 through 1570-5. Reference 1550 is used to show an enlarged version for ease of reference. The boundary vertex 1560-3 on patch 1420 is mapped to a new vertex 1570-1 on patch 1410, along the direction of arrow 1580-2.

Subfigure (c) triangles are split with edges connecting the newly created vertices 1590-1 through 1590-9 (optionally removing part of the triangle if the vertex was mapped into a triangle instead of an edge), generating new coplanar triangles on both patches. Then pairs of vertices (original border vertex and its mapped version on the other patch) are fused together (same 3D position and texture coordinates). If two or more pairs are very close to each other, their 3D positions (but not the texture coordinates) can optionally be merged together as well.

3.e) It is possible that vertices might not meet the criteria in steps 3.a to 3.d. Consider boundary vertices 1520-5 and 1520-1 of FIG. 15, where there seems to be no neighboring patch data in the direction (e.g., along arrows 1540) to be extrapolated. In this case, step 3.e of FIG. 11 is performed. In this step, for vertices with no neighboring patch data in the direction to be extrapolated: either these vertices can still be merged with another point from a neighboring patch because, e.g., a distance criterion is met; or they are left untouched, because there is no reliable way to know if it is a problem due to patch encoding or if it is the actual original mesh that has such a shape.

4) Local smoothing filtering is applied in FIG. 11 to ensure normal direction continuity and smoothness across the border. This filtering may be applied iteratively on each newly created and fused vertex until the cross curvature as illustrated on FIG. 15 meets a criterion that can be for example a threshold on the normal direction variation on faces that are connected to the processed vertex and that are intersected by a plane that is orthogonal to the border at the currently processed vertex. In further detail, the cross curvature is the curvature of the curve that corresponds to the cross-section of the merged surface along the arrows such as 1580-5 of FIG. 15. Due to merging, one can sometimes see bumps or crests along the pasted border that should not be there and reveal that a border was "pasted". A good criterion to ensure smoothness is to make sure such cross-section curves are also smooth. Optionally, the filter can modify not only the current vertex position but also the positions of the neighboring vertices of the current vertex.

5) In order to enable efficient inter-patch edge blending at the decoder side, parameters are derived at the encoder that describe the blending criteria for the decoder. These parameters can be stored in the same bitstream, e.g., V3C bitstream, with the encoded 2D representations of the encoded mesh and transmitted to the decoder. Currently there is no applicable syntax elements that would support the storage of the parameters, thus extension for V3C bitstream should be defined. Possible exemplary extensions are described below, after FIG. 16.

6) Encoding is continued in order to produce (e.g., and transmit) an output bitstream such as the output bitstream 522 of FIG. 5. While there could be many operations performed for the rest of the encoding, a few examples are provided below.

6.a) Encoding is performed to put the segmented 2D projections into the bitstream. It is noted that this step could be performed earlier, any time after step 0.b is performed.

6.b) Signaling of the parameters is performed, which could be in the bitstream or along with the bitstream (e.g., not in the bitstream but as data associated to the bitstream).

6.c) The bitstream and parameters are transmitted.

FIG. 16, which is split over FIGS. 16A and 16B, is a logic flow diagram for curvature-guided inter-patch 3D inpainting for dynamic mesh decoding, in accordance with an exemplary embodiment. FIG. 16 illustrates the operation of an exemplary method, a result of execution of computer program instructions embodied on a computer readable memory, functions performed by logic implemented in hardware, and/or interconnected means for performing functions in accordance with an exemplary embodiment. The blocks in FIG. 16 may be performed by an apparatus 10, e.g., under control of the control module 40 as implemented via a decoder 1000.

Many of the operations performed in decoding are similar to or the same as the operations in encoding as in FIG. 11. There may be differences due to decoding instead of encoding, thus the term "may be the same" is used. For ease of reference, only the main parts of the steps and, if applicable, differences are illustrated here.

0) A decoding process is performed for a bitstream. As part of this process, the following steps may be performed.

0.a) A bitstream and signaled parameters, in or along with the bitstream, are received. The bitstream comprises 2D projections of a mesh representation of a 3D object.

0.b) A 3D mesh is reconstructed from the segmented 2D projections.

The steps 1-4 may be considered to perform stitching reconstructed submeshes created during the reconstruction together at least as patches, the stitching using the signaled parameters to fuse together pairs of vertices for borders of corresponding patches. The stitching process begins in step 1, and steps 1 and 2 can be considered to be preparatory for the actual stitching that takes place beginning in step 3.

1) For each patch, neighboring patch boundaries reprojection is used to determine a first set of neighboring border sections that are candidates to be fused with parts of the current patch border. This may be the same as step 1 in FIG. 11.

2) For each boundary vertex of the current patch, the following are performed.

2.a) A set of all candidate neighboring patches vertices that are within a distance d that is smaller than an encoder-defined threshold (there can be more than one threshold per patch) is built. Note that the threshold is (or thresholds are) read from the bitstream.

2.b) For boundary vertices of all candidate neighboring patches, local patch border extrapolation is tested by creating virtual triangles across the border. This may be the same as step 2.b in FIG. 11.

2.c) If the information is present in the bitstream, check whether the two borders are allowed to be stitched together. If not, mark this for later operations (e.g., in step 4.e of FIG. 16).

In block 1610, once at least one neighboring patch border has been selected for each vertex of the current patch boundary, the actual stitching starts (block 1610=Start). If at least one neighboring patch border has not been selected for each vertex of the current patch boundary (block 1610=Select another patch), the flow proceeds to block (1) again.

3) For the blending process, stitching is performed of cross curvature orthogonally to the borders seen from the two patch borders to be fused.

3.a) Each border vertex from the first patch is mapped on the other patch border edges as vertices that lie on edges of the boundary or optionally on faces of the boundary. This may be the same as step 3.a in FIG. 11.

3.b) Each border vertex from the other patch is mapped to the first patch as vertices that lie on edges of the boundary or optionally on faces of the boundary. This may be the same as step 3.b in FIG. 11.

3.c) Local connectivity is modified to connect these mapped vertices to the other patch vertices as new triangles. In case of vertices mapped inside triangles, part of the triangle is removed so that the mapped vertex lies on the patch border. This may be the same as step 3.c in FIG. 11.

3.d) The pairs of vertices (original and mapped) are then fused together (their 3D position and texture coordinates). This may be the same as step 3.d in FIG. 11.

3.e) In this step, for vertices with no neighboring patch data in the direction to be extrapolated: either these vertices can still be merged with another point from a neighboring patch because, e.g., a distance criterion is met; or they are left untouched, because there is no reliable way to know if it is a problem due to patch encoding or if it is the actual original mesh that has such a shape. This may be the same as step 3.e in FIG. 11.

4) Local smoothing filtering is applied to ensure normal direction continuity and smoothness across the border. This may be the same as step 4 in FIG. 11.

Step 5 of FIG. 11 is not applicable to the decoding in FIG. 16. Therefore, this step is not shown in FIG. 16.

6) Continue with decoding in order to produce a modified three-dimensional mesh, as an output mesh, based at least on the stitching, the output mesh suitable for display as a representation of the three-dimensional object.

6.a) Output the output mesh.

As for defining the extension for V3C bitstream, FIG. 17 illustrates possible extensions, for instance for a V3C bitstream, for signaling for various values used to provide for curvature-guided inter-patch 3D inpainting for dynamic mesh coding, in accordance with exemplary embodiments. FIG. 17 is presented with a side (a), where signaling is illustrated for parameters derived (step 5 of FIG. 11) at the encoder that describe the stitching criteria for the decoder.

Side (b) indicates places of possible usage (e.g., in stitching) in FIG. 16. That is, for side (b), the signaled information is used such as for patching.

As one example, signaling for indicating the presence of values related to an inter-patch blending distance threshold could be added. See block 1710. As indicated by block 1750, this may be used in step 2.a of FIG. 16, which then affects the patching that is performed. This can be signaled in an extension syntax element to V3C parameter set (VPS), common atlas sequence parameter set (CASPS), common atlas frame parameter set (CAFPS), atlas sequence parameter set (ASPS) or even in atlas frame parameter set (AFPS). The following is an example of an extension to ASPS.

| | Descriptor |
|---|---|
| atlas_sequence_parameter_set_rbsp( ) { | |
| . . . | |
| asps_extension_present_flag | u(1) |
| If (asps_extension_present_flag ){ | |
| . . . | |
| asps_mesh_extension_present_flag | u(1) |
| . . . | |
| } | |
| if( asps_vpcc_extension_present_flag ) | |
| asps_vpcc_extension( ) /* Specified in Annex H */ | |
| if( asps_miv_extension_present_flag ) | |
| asps_miv_extension( ) /* Specified in ISO/IEC 23090-12 */ | |
| if( asps_mesh_extension_present_flag ) | |
| asps_mesh_extension( ) | |
| if( asps_extension_5bits ) | |
| while( more_rbsp_data( ) ) | |
| asps_extension_data_flag | u(1) |
| rbsp_trailing_bits( ) | |
| } | |
| } | |

| | Descriptor |
|---|---|
| asps_mesh_extension( ) { | |
| . . . | |
| asps_inter_patch_geometry_blending_info_present_flag | u(1) |
| . . . | |
| } | |

The asps_inter_patch_geometry_blending_info_present_ flag indicates if inter-patch blending threshold data is present in the sequence. That is, this is an indication indicating, per-patch, whether a corresponding patch should be blended to one or more neighboring patches using a single distance threshold value (e.g., stored in the corresponding patch data unit in the bitstream).

Secondly, an indicator in the patch data unit may be present that indicates if a given patch contains inter-patch blending threshold information. See block 1712. This information could be used (block 1752) in step 2.a of FIG. 16. Not all patches are required to contain inter-patch blending threshold information. If used, a per-patch inter-patch distance threshold indicator may be used to determine when the vertices on a patch edge should be blended to vertices on another patch edge. The below example illustrates how an indicator may be used to determine if inter-patch blending threshold information is present in the patch data unit syntax element.

| | Descriptor |
|---|---|
| patch_data_unit( tileID, patchIdx ) { | |
| . . . | |
| if(asps_mesh_extension_present_flag) | |
| pdu_mesh_extension( tileID,patchIdx ) | |
| if( asps_miv_extension_present_flag ) | |
| pdu_miv_extension( tileID, patchIdx ) /* Specified in ISO/IEC 23090-12 | |
| */ | |
| } | |

| | Descriptor |
|---|---|
| pdu_mesh_extension( tileID, patchIdx ) { | |
| . . . | |
| if(asps_inter_patch_geometry_blending_info_present_flag) | |
| pdu_inter_patch_geometry_blending_info_present_flag | u(1) |
| if(pdu_inter_patch_geometry_blending_info_present_flag) | |
| inter_patch_blending_information( tileID,patchIdx ) | |
| } | |

The pdu_inter_patch_geometry_blending_info_present_ flag indicates whether inter-patch blending threshold data is present in the patch data unit. At least the inter_patch_blend- ing_information (tileID, patchIdx) may be used to perform the inter-patch blending.

Thirdly, an inter-patch blending threshold unit may be stored in a dedicated syntax structure in the patch data unit. See block 1714. This information could be used in step 2.a of FIG. 16 (see block 1754). The syntax could be as described in the below table.

| | Descriptor |
|---|---|
| inter_patch_blending_information( tileID, patchIdx ) { | |
| pdu_inter_patch_single_distance_threshold_flag | u(1) |
| If(pdu_inter_patch_single_distance_threshold_flag){ | |
| pdu_inter_patch_distance_threshold | ue(v) |
| } else { | |
| pdu_valid_neighboring_patch_number_minus1 | ue(v) |
| for (i =0, i<pdu_valid_neighboring_patch_number_minus1, i++){ | |
| pdu_valid_neighboring_patch[i] | ue(v) |
| pdu_inter_patch_distance_threshold[i] | ue(v) |
| } | |
| } | |
| } | |

The pdu_inter_patch_single_distance_threshold_flag indicates if inter-patch-blending information is provided for the patch as a single value or multiple values. See block 1716. This information could be used in steps 2.a and 2.b of FIG. 16 (see block 1756).

The pdu_inter_patch_distance_threshold describes the inter-patch blending threshold that should be used for all neighboring patches to determine how patch edges should be connected. See block 1718. This information could be used in steps 2.a and 2.b of FIG. 16 (see block 1758).

The pdu_valid_neighboring_patch_number_minus1 describes the number of patches for which inter-patch blend- ing threshold is provided individually. See block 1720. This information could be used in steps 2.a and 2.b of FIG. 16 (see block 1760).

The pdu_valid_neighboring patch [i] indicates the patch id of the neighboring patch for which specific inter-patch blending threshold is provided. See block 1722. This infor- mation could be used in step 2.c of FIG. 16 (see block 1762).

The pdu_inter_patch_distance_threshold [i] indicates the inter-patch blending distance threshold for the given patch. See block 1724. This information could be used in step 2.c of FIG. 16 (see block 1764).

In another embodiment the information can be provided as Supplemental Enhancement Information. See block 1726. This information could be used in step 2.a of FIG. 16 (see block 1766). Note also that block 1726 contains the same information as block 1714 but written differently in the bitstream (SEI versus patch data unit, respectively); but their effect is the same.

| | Descriptor |
|---|---|
| mesh_reconstruction_info( payloadSize ) { | |
| . . . | |
| mri_tile_count_minus1 | u(8) |
| for (i = 0; i < mri_tile_count_minus1+ 1; i ++){ | |

-continued

|                                                                                                                         | Descriptor |
|-------------------------------------------------------------------------------------------------------------------------|------------|
| mri_tile_id[ i ]                                                                                                        | u(16)      |
| mri_patch_count_minus1[ i ]                                                                                             | u(16)      |
| tileID = mri_tile_id[ i ]                                                                                               |            |
| for (patchIdx = 0; patchIdx <mri_patch_count_minus1 + 1; patchIdx ++){                                                  |            |
|     pdu_inter_patch_geometry_blending_info_present_flag [ i ]                                       | u(1)       |
|     if(pdu_inter_patch_geometry_blending_info_present_flag)                                         |            |
|       inter_patch_blending_information( tileID,patchIdx)                                   |            |
|     }                                                                                               |            |
|   }                                                                                                           |            |
| }                                                                                                                       |            |
| . . .                                                                                                                   |            |
| }                                                                                                                       |            |

The mri_tile_count_minus1 provides number of tiles in an atlas.

The mri_tile_id [i] indicates tileID of a tile with index i.

The mri_patch_count_minus1 [i] provides number of patches of in a tile with tile ID equal tileID.

The mri_inter_patch_geometry_blending_info_present_flag [i] has the same semantics as pdu_inter_patch_geometry_blending_info_present_flag [i].

IV. Additional Examples and Details

Without in any way limiting the scope, interpretation, or application of the claims appearing below, a technical effect and advantage of one or more of the example embodiments disclosed herein is in contrast to conventional techniques, there is no need of the original mesh connectivity at the decoder to enable patch border blending. Another technical effect and advantage of one or more of the example embodiments disclosed herein is the present embodiments enable smooth patch blending with correct and smooth texture coordinate mapping. Another technical effect and advantage of one or more of the example embodiments disclosed herein is without the encoder information (thresholds, valid borders), the decoder cannot produce a reasonably good patch blending for some complex shape issues such as hands and fingers, or when the original mesh contains holes, and the examples herein provide such information. Another technical effect and advantage of one or more of the example embodiments disclosed herein is based on this information, the computational complexity of the decoder-side patch border blending is significantly simplified for an increased quality.

The following are further examples.

Example 1. A method, comprising:

performing by an apparatus an encoding process comprising:

obtaining a mesh representation of a three-dimensional object;

segmenting mesh representation of the three-dimensional object into two-dimensional projections;

reconstructing a three-dimensional mesh from the segmented two-dimensional projections at least by stitching reconstructed patches, the patches being submeshes of the reconstructed three-dimensional mesh, the stitching performing border fusion based at least on curvature of the patches, to derive parameters for the stitching;

encoding the segmented two-dimensional projections into a bitstream;

signaling by the apparatus the parameters in or along with the bitstream; and transmitting by the apparatus the bitstream and the parameters.

Example 2. The method according to example 1, wherein the stitching is performed for two patches considering cross curvature orthogonally of corresponding two borders of the two patches, as seen from the two patch borders to be fused.

Example 3. The method according to example 2, wherein considering cross curvature orthogonally of corresponding two borders of the two patches uses a normal direction's angular variation from a first of the two patches and a second of the two patches and the normal direction's angular variation from the second patch and the first patch.

Example 4. The method according to any one of examples 1 to 3, wherein the parameters comprise a flag indicating whether inter-patch blending parameters are present in the bitstream.

Example 5. The method according to any one of examples 1 to 4, wherein the parameters comprise an indication indicating, per-patch, whether a corresponding patch should be blended to one or more neighboring patches using a single distance threshold value.

Example 6. The method according to any one of examples 1 to 5, wherein the parameters comprise a per-patch inter-patch distance threshold indicator, which is used to determine when the vertices on a patch edge should be blended to vertices on an other patch edge.

Example 7. The method according to any one of examples 1 to 6, wherein the parameters comprise an indicator indicating a number of other patches with which the edges in a patch should be blended.

Example 8. The method according to any one of examples 1 to 7, wherein the parameters comprise one or more patch indices, indicating identifiers for connected patches, and one or more depth distance thresholds, indicating a distance threshold per identified patch, which is used to determine whether edges between patches should be blended.

Example 9. A method, comprising:

receiving by an apparatus a bitstream and signaled parameters in or along with the bitstream, the bitstream comprising two-dimensional projections of a mesh representation of a three-dimensional object;

performing by the apparatus a decoding process comprising:

reconstructing a three-dimensional mesh from the segmented two-dimensional projections; and stitching reconstructed submeshes created during the reconstruction together at least as patches, the stitching using the signaled parameters to fuse together pairs of vertices for borders of corresponding patches; and outputting by the apparatus a modified three-dimensional mesh, as an output mesh, based at least on the stitching, the output mesh suitable for display as a representation of the three-dimensional object.

Example 10. The method according to example 9, wherein the stitching is performed for two patches considering cross curvature orthogonally of corresponding two borders of the two patches, as seen from the two patch borders to be fused.

Example 11. The method according to example 10, wherein considering cross curvature orthogonally of corresponding two borders of the two patches uses a normal direction's angular variation from a first of the two patches and a second of the two patches and the normal direction's angular variation from the second patch and the first patch.

Example 12. The method according to any one of examples 9 to 11, wherein the parameters comprise a flag indicating whether inter-patch blending parameters are present in the bitstream and the stitching uses at least the inter-patch blending parameters in response to the inter-patch stitching parameters being present in the bitstream according to the flag.

Example 13. The method according to any one of examples 9 to 12, wherein the parameters comprise an indication indicating, per-patch, whether a corresponding patch should be blended to one or more neighboring patches using a single distance threshold value, and the stitching blends the corresponding patch with the one or more neighboring patches in response to the syntax element indicating for the corresponding patch that the corresponding patch should be blended with the one or more neighboring patches.

Example 14. The method according to any one of examples 9 to 13, wherein the parameters comprise a per-patch inter-patch distance threshold indicator, which is used during the stitching to determine when the vertices on a patch edge should be blended to vertices on an other patch edge.

Example 15. The method according to any one of examples 9 to 14, wherein the parameters comprise an indicator indicating a number of other patches with which the edges in a patch should be blended, and the stitching blends the patch with the number of other patches in response to the syntax element indicating for the patch the number of other patches with which the edges in a patch should be blended.

Example 16. The method according to any one of examples 9 to 15, wherein the parameters comprise one or more patch indices, indicating identifiers for connected patches, and one or more depth distance thresholds, indicating a distance threshold per identified patch, which is used to determine whether edges between patches should be blended, and wherein the stitching comprises using the identifiers for connected patches in the one or more patch indices and corresponding distance threshold per identified ones of the connected patches to stitch the connected patches.

Example 17. A computer program, comprising code for performing the methods of any of examples 1 to 16, when the computer program is run on a computer.

Example 18. The computer program according to example 17, wherein the computer program is a computer program product comprising a computer-readable medium bearing computer program code embodied therein for use with the computer.

Example 19. The computer program according to example 17, wherein the computer program is directly loadable into an internal memory of the computer.

Example 20. An apparatus, comprising means for performing:
performing by an apparatus an encoding process comprising:
obtaining a mesh representation of a three-dimensional object;
segmenting mesh representation of the three-dimensional object into two-dimensional projections;
reconstructing a three-dimensional mesh from the segmented two-dimensional projections at least by stitching reconstructed patches, the patches being submeshes of the reconstructed three-dimensional mesh, the stitching performing border fusion based at least on curvature of the patches, to derive parameters for the stitching;
encoding the segmented two-dimensional projections into a bitstream;
signaling by the apparatus the parameters in or along with the bitstream; and
transmitting by the apparatus the bitstream and the parameters.

Example 21. The apparatus according to example 20, wherein the stitching is performed for two patches considering cross curvature orthogonally of corresponding two borders of the two patches, as seen from the two patch borders to be fused.

Example 22. The apparatus according to example 21, wherein considering cross curvature orthogonally of corresponding two borders of the two patches uses a normal direction's angular variation from a first of the two patches and a second of the two patches and the normal direction's angular variation from the second patch and the first patch.

Example 23. The apparatus according to any one of examples 20 to 22, wherein the parameters comprise a flag indicating whether inter-patch blending parameters are present in the bitstream.

Example 24. The apparatus according to any one of examples 20 to 23, wherein the parameters comprise an indication indicating, per-patch, whether a corresponding patch should be blended to one or more neighboring patches using a single distance threshold value.

Example 25. The apparatus according to any one of examples 20 to 24, wherein the parameters comprise a per-patch inter-patch distance threshold indicator, which is used to determine when the vertices on a patch edge should be blended to vertices on an other patch edge.

Example 26. The apparatus according to any one of examples 20 to 25, wherein the parameters comprise an indicator indicating a number of other patches with which the edges in a patch should be blended.

Example 27. The apparatus according to any one of examples 20 to 26, wherein the parameters comprise one or more patch indices, indicating identifiers for connected patches, and one or more depth distance thresholds, indicating a distance threshold per identified patch, which is used to determine whether edges between patches should be blended.

Example 28. An apparatus, comprising means for performing:
receiving by an apparatus a bitstream and signaled parameters in or along with the bitstream, the bitstream comprising two-dimensional projections of a mesh representation of a three-dimensional object;
performing by the apparatus a decoding process comprising:
reconstructing a three-dimensional mesh from the segmented two-dimensional projections; and stitching reconstructed submeshes created during the reconstruction together at least as patches, the stitching using the signaled parameters to fuse together pairs of vertices for borders of corresponding patches; and outputting by the apparatus a modified three-dimensional mesh, as an output mesh, based at least on the stitching, the output mesh suitable for display as a representation of the three-dimensional object.

Example 29. The apparatus according to example 28, wherein the stitching is performed for two patches considering cross curvature orthogonally of corresponding two borders of the two patches, as seen from the two patch borders to be fused.

Example 30. The apparatus according to example 28, wherein considering cross curvature orthogonally of corresponding two borders of the two patches uses a normal direction's angular variation from a first of the two patches and a second of the two patches and the normal direction's angular variation from the second patch and the first patch.

Example 31. The apparatus according to any one of examples 28 to 30, wherein the parameters comprise a flag indicating whether inter-patch blending parameters are present in the bitstream and the stitching uses at least the inter-patch blending parameters in response to the inter-patch stitching parameters being present in the bitstream according to the flag.

Example 32. The apparatus according to any one of examples 28 to 31, wherein the parameters comprise an indication indicating, per-patch, whether a corresponding patch should be blended to one or more neighboring patches using a single distance threshold value, and the stitching blends the corresponding patch with the one or more neighboring patches in response to the syntax element indicating for the corresponding patch that the corresponding patch should be blended with the one or more neighboring patches.

Example 33. The apparatus according to any one of examples 28 to 32, wherein the parameters comprise a per-patch inter-patch distance threshold indicator, which is used during the stitching to determine when the vertices on a patch edge should be blended to vertices on an other patch edge.

Example 34. The apparatus according to any one of examples 28 to 33, wherein the parameters comprise an indicator indicating a number of other patches with which the edges in a patch should be blended, and the stitching blends the patch with the number of other patches in response to the syntax element indicating for the patch the number of other patches with which the edges in a patch should be blended.

Example 35. The apparatus according to any one of examples 28 to 34, wherein the parameters comprise one or more patch indices, indicating identifiers for connected patches, and one or more depth distance thresholds, indicating a distance threshold per identified patch, which is used to determine whether edges between patches should be blended, and wherein the stitching comprises using the identifiers for connected patches in the one or more patch indices and corresponding distance threshold per identified ones of the connected patches to stitch the connected patches.

Example 36. The apparatus of any preceding apparatus example, wherein the means comprises:

at least one processor; and at least one memory including computer program code, the at least one memory and computer program code configured to, with the at least one processor, cause the performance of the apparatus.

Example 37. An apparatus, comprising:

one or more processors; and one or more memories including computer program code, wherein the one or more memories and the computer program code are configured, with the one or more processors, to cause the apparatus to:

perform by the apparatus an encoding process to cause the apparatus to:

obtain a mesh representation of a three-dimensional object;

segment mesh representation of the three-dimensional object into two-dimensional projections;

reconstruct a three-dimensional mesh from the segmented two-dimensional projections at least by stitching reconstructed patches, the patches being submeshes of the reconstructed three-dimensional mesh, the stitching performing border fusion based at least on curvature of the patches, to derive parameters for the stitching;

encoding the segmented two-dimensional projections into a bitstream;

signal by the apparatus the parameters in or along with the bitstream; and transmit by the apparatus the bitstream and the parameters.

Example 38. A computer program product comprising a computer-readable storage medium bearing computer program code embodied therein for use with a computer, the computer program code comprising:

code for performing by an apparatus an encoding process comprising:

code for obtaining a mesh representation of a three-dimensional object;

code for segmenting mesh representation of the three-dimensional object into two-dimensional projections;

code for reconstructing a three-dimensional mesh from the segmented two-dimensional projections at least by stitching reconstructed patches, the patches being submeshes of the reconstructed three-dimensional mesh, the stitching performing border fusion based at least on curvature of the patches, to derive parameters for the stitching;

code for encoding the segmented two-dimensional projections into a bitstream;

code for signaling by the apparatus the parameters in or along with the bitstream; and code for transmitting by the apparatus the bitstream and the parameters.

Example 39. An apparatus, comprising:

one or more processors; and one or more memories including computer program code, wherein the one or more memories and the computer program code are configured, with the one or more processors, to cause the apparatus to:

receive by the apparatus a bitstream and signaled parameters in or along with the bitstream, the bitstream comprising two-dimensional projections of a mesh representation of a three-dimensional object;

perform by the apparatus a decoding process causing the apparatus at least to:

reconstruct a three-dimensional mesh from the segmented two-dimensional projections; and stitch reconstructed submeshes created during the reconstruction together at least as patches, the stitching using the signaled parameters to fuse together pairs of vertices for borders of corresponding patches; and output by the apparatus a modified three-dimensional mesh, as an output mesh, based at least on the stitching, the output mesh suitable for display as a representation of the three-dimensional object.

Example 40. A computer program product comprising a computer-readable storage medium bearing computer program code embodied therein for use with a computer, the computer program code comprising:

code for receiving by an apparatus a bitstream and signaled parameters in or along with the bitstream, the bitstream comprising two-dimensional projections of a mesh representation of a three-dimensional object;

code for performing by the apparatus a decoding process comprising:

code for reconstructing a three-dimensional mesh from the segmented two-dimensional projections; and code for stitching reconstructed submeshes created during the reconstruction together at least as patches, the stitching using the signaled parameters to fuse together pairs of vertices for borders of corresponding patches; and code for outputting by the apparatus a modified three-dimensional mesh, as an output mesh, based at least on the stitching, the output mesh suitable for display as a representation of the three-dimensional object.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 10. A computer-readable medium may comprise a computer-readable storage medium (e.g., memories 25 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

| | |
|---|---|
| 2D or 2d | two-dimensional |
| 3D or 3d | three-dimensional |
| 6DOF | six degrees of freedom |
| ACL | atlas coding layer |
| AFPS | atlas frame parameter set |
| ASPS | atlas sequence parameter set |
| CAFPS | common atlas frame parameter set |
| CASPS | common atlas sequence parameter set |
| CfP | call for proposals |
| CGI | computer generated imagery |
| ID or id | identification |
| MIV | MPEG immersive video |
| MPEG | Motion Picture Experts Group |
| MR | mixed reality |
| NAL | network abstraction layer |
| RBSP | raw byte sequence payload |
| V3C | visual volumetric video-based coding |
| VPCC | video point cloud connection |
| VPS | V3C parameter set |
| VR | virtual reality |

What is claimed is:

1. A method, comprising:

receiving by an apparatus a bitstream and signaled parameters in or along with the bitstream, the bitstream comprising segmented two-dimensional projections of a mesh representation of a three-dimensional object;

performing by the apparatus a decoding process comprising:

reconstructing a three-dimensional mesh from the segmented two-dimensional projections;

stitching together reconstructed submeshes from the three-dimensional mesh, created during the reconstruction at least as patches, the stitching together using the signaled parameters to fuse together pairs of vertices for borders of corresponding patches based at least on curvature of the corresponding patches; and outputting by the apparatus a modified three-dimensional mesh, as an output mesh, based at least on the stitching, the output mesh suitable for display as a representation of the three-dimensional object.

2. The method according to claim 1, wherein the stitching is performed for two patches considering cross curvature orthogonally of corresponding two borders of the two patches, as seen from the two patch borders to be fused.

3. The method according to claim 1, wherein the parameters comprise a flag indicating whether inter-patch blending parameters are present in the bitstream and the stitching uses at least the inter-patch blending parameters in response to the inter-patch blending parameters being present in the bitstream according to the flag.

4. The method according to claim 1, wherein the parameters comprise an indication indicating, on a per-patch basis, whether a corresponding patch should be blended to one or more neighboring patches using a single distance threshold value, and the stitching blends the corresponding patch with the one or more neighboring patches in response to a syntax element indicating for the corresponding patch that the corresponding patch should be blended with the one or more neighboring patches.

5. An apparatus, comprising:
one or more processors; and
one or more memories storing instructions that, when executed by the one or more processors, cause the apparatus at least to perform
performing an encoding process comprising:
obtaining a mesh representation of a three-dimensional object;
segmenting mesh representation of the three-dimensional object into segmented two-dimensional projections;
reconstructing a three-dimensional mesh from the segmented two-dimensional projections at least by stitching together reconstructed patches, the patches being submeshes of the reconstructed three-dimensional mesh, the stitching performing border fusion of the patches based at least on curvature of the patches, to derive parameters for the stitching;
encoding the segmented two-dimensional projections into a bitstream;
signaling by the apparatus the parameters in or along with the bitstream; and
transmitting by the apparatus the bitstream and the parameters.

6. The apparatus according to claim 5, wherein the stitching is performed for two patches considering cross curvature orthogonally of corresponding two borders of the two patches, as seen from the two patch borders to be fused.

7. The apparatus according to claim 6, wherein considering cross curvature orthogonally of corresponding two borders of the two patches uses a normal direction's angular variation from a first of the two patches and a second of the two patches and the normal direction's angular variation from the second patch and the first patch.

8. The apparatus according to claim 5, wherein the parameters comprise a flag indicating whether inter-patch blending parameters are present in the bitstream.

9. The apparatus according to claim 5, wherein the parameters comprise an indication indicating, on a per-patch basis, whether a corresponding patch should be blended to one or more neighboring patches using a single distance threshold value.

10. The apparatus according to claim 5, wherein the parameters comprise a per-patch inter-patch distance threshold indicator, which is used to determine when vertices on a patch edge should be blended to vertices on an other patch edge.

11. The apparatus according to claim 5, wherein the parameters comprise an indicator indicating a number of other patches with which the edges in a patch should be blended.

12. The apparatus according to claim 5, wherein the parameters comprise one or more patch indices, indicating identifiers for connected patches, and one or more depth distance thresholds, indicating a distance threshold per identified patch, which is used to determine whether edges between patches should be blended.

13. An apparatus, comprising:
one or more processors; and
one or more memories storing instructions that, when executed by the one or more processors, cause the apparatus at least to perform:
receiving by the apparatus a bitstream and signaled parameters in or along with the bitstream, the bitstream comprising segmented two-dimensional projections of a mesh representation of a three-dimensional object;
performing by the apparatus a decoding process comprising:
reconstructing a three-dimensional mesh from the segmented two-dimensional projections;
stitching together reconstructed submeshes from the three-dimensional mesh, created during the reconstruction at least as patches, the stitching together using the signaled parameters to fuse together pairs of vertices for borders of corresponding patches based at least on curvature of the corresponding patches; and
outputting by the apparatus a modified three-dimensional mesh, as an output mesh, based at least on the stitching, the output mesh suitable for display as a representation of the three-dimensional object.

14. The apparatus according to claim 13, wherein the stitching is performed for two patches considering cross curvature orthogonally of corresponding two borders of the two patches, as seen from the two patch borders to be fused.

15. The apparatus according to claim 14, wherein considering cross curvature orthogonally of corresponding two borders of the two patches uses a normal direction's angular variation from a first of the two patches and a second of the two patches and the normal direction's angular variation from the second patch and the first patch.

16. The apparatus according to claim 13, wherein the parameters comprise a flag indicating whether inter-patch blending parameters are present in the bitstream and the stitching uses at least the inter-patch blending parameters in response to the inter-patch blending parameters being present in the bitstream according to the flag.

17. The apparatus according to claim 13, wherein the parameters comprise an indication indicating, on a per-patch basis, whether a corresponding patch should be blended to one or more neighboring patches using a single distance threshold value, and the stitching blends the corresponding patch with the one or more neighboring patches in response to a syntax element indicating for the corresponding patch that the corresponding patch should be blended with the one or more neighboring patches.

18. The apparatus according to claim 13, wherein the parameters comprise a per-patch inter-patch distance threshold indicator, which is used during the stitching to determine when the vertices on a patch edge should be blended to vertices on an other patch edge.

19. The apparatus according to claim 13, wherein the parameters comprise an indicator indicating a number of other patches with which the edges in a patch should be blended, and the stitching blends the patch with the number of other patches in response to a syntax element indicating for the patch the number of other patches with which the edges in a patch should be blended.

20. The apparatus according to claim 13, wherein the parameters comprise one or more patch indices, indicating identifiers for connected patches, and one or more depth distance thresholds, indicating a distance threshold per identified patch, which is used to determine whether edges between patches should be blended, and wherein the stitching comprises using the identifiers for connected patches in the one or more patch indices and corresponding distance threshold per identified ones of the connected patches to stitch the connected patches.

\* \* \* \* \*